(12) United States Patent
Ohsugi

(10) Patent No.: US 8,643,903 B2
(45) Date of Patent: Feb. 4, 2014

(54) PRINTING APPARATUS

(75) Inventor: Jitsui Ohsugi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 350 days.

(21) Appl. No.: 13/112,760

(22) Filed: May 20, 2011

(65) Prior Publication Data

US 2011/0286046 A1    Nov. 24, 2011

(30) Foreign Application Priority Data

May 21, 2010    (JP) .................. 2010-117368

(51) Int. Cl.
*H04N 1/40*    (2006.01)
*H04N 1/60*    (2006.01)
*G03G 15/00*    (2006.01)

(52) U.S. Cl.
USPC ............... 358/3.01; 358/1.9; 399/49; 399/58; 399/62

(58) Field of Classification Search
USPC .................. 358/3.01, 1.9; 399/62, 49, 58
See application file for complete search history.

(56) References Cited

U.S. PATENT DOCUMENTS 7,860,415 B2 *    12/2010    Tokuyama et al. ............. 399/62

FOREIGN PATENT DOCUMENTS

| JP | 2006-82482 A | 3/2006 |
|---|---|---|
| JP | 2006-272607 A | 10/2006 |
| JP | 2006-287708 A | 10/2006 |
| JP | 2007-65377 A | 3/2007 |

* cited by examiner

*Primary Examiner* — Charlotte M Baker
(74) *Attorney, Agent, or Firm* — Birch, Stewart, Kolasch & Birch, LLP

(57) ABSTRACT

Provided is a printing apparatus in which a printed material of a same page is printed in almost same color tone even in a case where calibration execution conditions are satisfied in executing printing processing and concentration correction information is updated. A decision portion decides, when a calibration execution portion executes calibration in executing print image data generation processing based on print setting information of N-up printing, poster printing and the like, whether print image data of N-up printing, poster printing and the like is generated using concentration correction information before update or concentration correction information after update based on print setting information analyzed by a data analyzing portion. Then, based on the decision results, the print image data generation portion generates print image data of N-up printing, poster printing and the like.

19 Claims, 18 Drawing Sheets

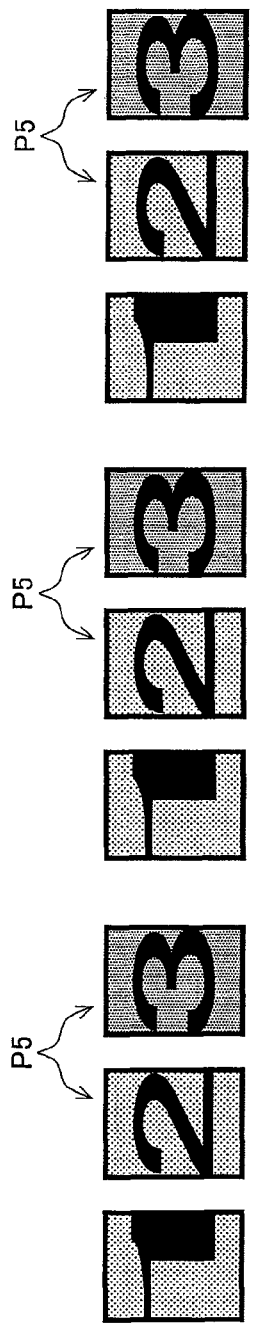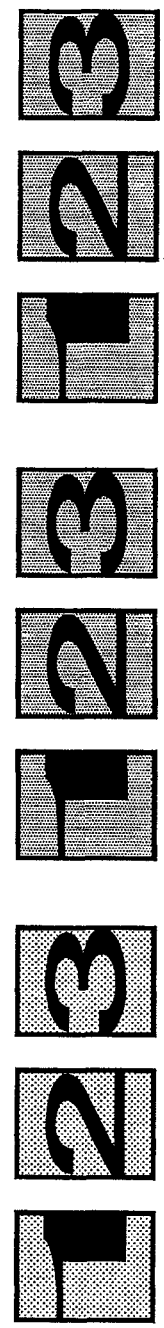

<CORRECTION INFORMATION UPDATE SETTING>

● SPACING BETWEEN PAGES IS NOT PERMITTED

○ SPACING BETWEEN PAGES IS PERMITTED

○ PERMIT ALL
　○ DESIGNATE PRINT SETTING TO BE PERMITTED
　　☐ POSTER PRINTING
　　☐ N-UP PRINTING
　　☐ COPY NUMBER
　　☐ COLOR/MONOCHROME MIXING
　　☐ SADDLE STITCH PRINTING
　　☐ DOUBLE-SIDED PRINTING

DETAILED SETTING
○ PRIORITY TO IMAGE QUALITY
○ PRIORITY TO SPEED

US 8,643,903 B2

PRINTING APPARATUS

CROSS-NOTING PARAGRAPH

This non-provisional application claims priority under 35 U.S.C. §119(a) on Patent Application No. 2010-117368 filed in JAPAN on May 21, 2010, the entire contents of which are hereby incorporated herein by reference.

FIELD OF THE INVENTION

The present invention relates to a printing apparatus that executes calibration.

BACKGROUND OF THE INVENTION

Image quality of printing in a printed material is deteriorated depending on change in environment such as temperature, humidity, etc., a state of consumable goods of a printing apparatus, the number of print sheets and the like at the time of printing. Therefore, a printing apparatus executes calibration (also referred to as process control) when specific conditions are satisfied, for example, with every XX days in a case where change in temperature or humidity is X or more, with every XXX sheets of printing and the like, and generates concentration correction information. Then, the printing apparatus generates print image data (bitmap) using the generated concentration correction information and prints the print image data, thereby preventing degradation of image quality of printing.

In calibration, processing described below is mainly executed. First, when the specific conditions (hereinafter, described as calibration execution conditions) are satisfied, a printing apparatus forms toner images for testing (referred to as toner patches) whose concentrations are different from each other on a surface of a photoreceptor drum or on an intermediate transfer member, detects reflection light from the toner patches using a concentration sensor such as an optical sensor, and measures concentrations of the toner images.

The printing apparatus then generates "concentration correction information" based on the measured concentrations. The concentration correction information is information used, for example, when a measured concentration of a toner image is low, in changing a processing content of RIP (Raster Image Processing) so that a concentration of a toner image to be newly generated on a surface of a photoreceptor drum and the like becomes high. The RIP means processing to generate print image data (bitmap) from PDL (Page Description Language) of 1 page using concentration correction information.

Such concentration correction information includes, for example, information for changing a dither pattern generated by RIP into a dither pattern whose painted-out area is larger.

When update of the concentration correction information is finished, the printing apparatus executes the RIP to generate print image data using the concentration correction information after update and executes printing processing of the print image data.

A printing execution data outputting system that executes such calibration is disclosed in Japanese Laid-Open Patent Publication No. 2006-082482, and an image processing system for executing such calibration is disclosed in Japanese Laid-Open Patent Publication No. 2006-287708.

Meanwhile, there has been a problem that at the time of executing aggregating printing (hereinafter, described as N-up printing), when calibration execution conditions are satisfied and a printing apparatus executes calibration, a difference is caused between an image concentration (also referred to as color tone) of a printed material of print image data generated using concentration correction information before update and an image concentration of a printed material of print image data generated using concentration correction information after update, which makes a user feel uncomfortable. Note that, N-up printing means processing in which print image data corresponding to a plurality of documents is aggregated into print image data corresponding to 1 page and the aggregated print image data is printed.

FIG. 14A and FIG. 14B are diagrams for specifically explaining such a problem. FIG. 14A is a diagram showing print image data corresponding to documents of 8 pages. FIG. 14B is a diagram showing print image data for 4-up printing (in the order of upper left, upper right, lower left, lower right) generated at the time of performing 4-up printing of the print image data shown in FIG. 14A.

When executing 4-up printing, a printing apparatus normally generates print image data sequentially from a first page so as to generate print image data corresponding to a document of 1 to 4 pages, print image data of 4 pages is aggregated to generate one print image data for 4-up printing as shown by a reference number P14 is generated.

Here, for example, assuming that at the time of finishing generation processing of print image data corresponding to a document in a second page as shown in FIG. 14A, calibration execution conditions are satisfied and concentration correction information is updated. At the time, a conventional printing apparatus uses concentration correction information after update in generating print image data corresponding to a document in a third page. The printing apparatus then generates print image data after the third page using the concentration correction information after update. Therefore, as shown by a reference number P15, in print image data on a same page, images whose color tones are different from each other are generated. When a printing apparatus prints the print image data, images whose color tones are different from each other are printed in a printed material of the same page, which may cause a user who looks this to feel uncomfortable.

SUMMARY OF THE INVENTION

An object of the present invention is to provide a printing apparatus in which a printed material of a same page is printed in almost same color tone even in a case where calibration execution conditions are satisfied in executing printing processing and concentration correction information is updated.

An object of the present invention is to provide a printing apparatus including a calibration execution portion to update concentration correction information for correcting an image concentration, a concentration correction information storage portion to store concentration correction information after update that is updated by execution of calibration and concentration correction information before update, a print image data generation portion to generate print image data using the concentration correction information, an analyzing portion to analyze print setting information according to print data, and a control portion to decide, when the calibration execution portion executes calibration while executing print image data generation processing based on the print setting information, whether the concentration correction information before update or the concentration correction information after update is used to generate print image data based on an analysis result of the analyzing portion, in which the print image data generation portion generates print image data based on a decision result of the control portion.

Another object of the present invention is to provide a printing apparatus including an operation portion to receive an instruction operation on whether printing is performed by giving priority to an image quality or printing is performed by giving priority to a speed, before execution of printing processing, a print image data storage portion to store print image data for each page which is generated by the print image data generation portion in the order of generation, in which the control portion selects, when the calibration execution portion executes calibration while executing print image data generation processing based on the print setting information, print image data to be newly generated using the concentration correction information after update from among print image data stored in the print image data storage portion based on an instruction content from the operation portion and an analysis result of print data analyzed by the analyzing portion, and the print image data generation portion generates print image data using the concentration correction information after update based on the selection.

Another object of the present invention is to provide a printing apparatus, in which the control portion includes a counter function to count the number of pages of print image data to be generated, and when the print setting information of the print data is N-up printing, the control portion decides, in a case where the number of pages of print image data to be generated after executing calibration is 1+multiples of N, to generate print image data for N-up printing using the concentration correction information after update.

Another object of the present invention is to provide a printing apparatus, in which the control portion includes a counter function to count the number of pages of print image data to be generated, and when the print setting information of the print data is poster printing in which print image data corresponding to a document of 1 page is enlarged and divided into M×N and printed or poster printing in which print image data corresponding to a document of 1 page is divided into M×N and enlarged printing is performed for the print image data that is divided into M×N, the control portion decides, in a case where the number of pages of print image data to be generated after executing calibration is 1+multiples of (M×N), to generate print image data for the poster printing using the concentration correction information after update.

Another object of the present invention is to provide a printing apparatus, in which the control portion includes a color mode detection function to detect a color mode of print image data to be generated, and when the print setting information of the print data is color/monochrome mixed printing, the control portion decides, in a case where a color mode of print image data to be generated after executing calibration is different from a color mode of print image data generated on a previous page, to generate print image data for the color/monochrome mixed printing using the concentration correction information after update Another object of the present invention is to provide a printing apparatus, in which the control portion includes a counter function to count the number of pages of print image data to be generated, and when the print setting information of the print data is multiple copy printing in which multiple copy printing is performed for a document of N pages in copy unit, the control portion decides to generate print image data for the multiple copy printing using the concentration correction information after update from a top page of a next copy.

Another object of the present invention is to provide a printing apparatus, in which the control portion includes a counter function to count the number of pages of print image data to be generated, and when the print setting information of the print data is saddle stitch printing or double-sided printing, the control portion decides, in a case where the number of pages of the print image data to be generated after executing calibration is an even number, to generate print image data for the saddle stitch printing, or print image data for the double-sided printing using concentration correction information after update.

Another object of the present invention is to provide a printing apparatus, in which when the print setting information of the print data is normal single-sided printing, the control portion decides, from print image data to be generated after executing calibration, to generate print image data for the single-sided printing using concentration correction information after update.

Another object of the present invention is to provide a printing apparatus, in which an operation portion to receive an operation to input print setting information is included, and the control portion executes the decision only when the print setting information received by the operation portion is the same as the print setting information of the print data analyzed by the analyzing portion.

BRIEF DESCRIPTION OF THE DRAWINGS

FIG. 6A and FIG. 6B are diagrams showing an example of printing processing to be executed in the printing apparatus of the present invention at the time of multiple copy printing;

FIG. 11 is a diagram showing an example of a setting screen;

PREFERRED EMBODIMENTS OF THE INVENTION

Example 1

Figure 1A:
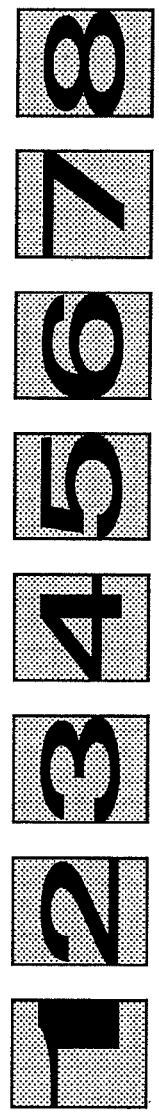
FIG. 1A and FIG. 1B are explanatory views explaining an example of printing processing executed in a printing apparatus according to the present invention.
Figure 1B:
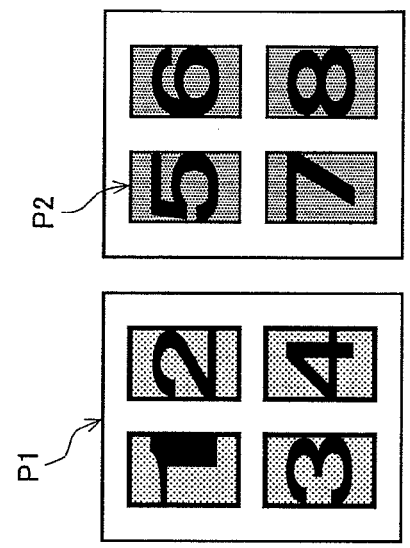

Description will be given for printing processing executed in a printing apparatus according to the present invention with use of FIG. 1A and FIG. 1B. FIG. 1A is a diagram showing print image data corresponding to a document of 8 pages. FIG. 1B is a diagram showing print image data for 4-up printing generated at the time of performing 4-up printing of the print image data shown in FIG. 1A (in the order of upper left, upper right, lower left, lower right).

At the time of executing 4-up printing, a printing apparatus normally generates print image data sequentially from a first page for generating print image data corresponding to a document in 1 to 4 pages, print image data of 4 pages is aggregated and one print image data for 4-up printing is generated as shown by a reference number P14.

Here, for example, assuming that at the time of finishing generation processing of print image data corresponding to a document in a second page as shown in FIG. 1A, calibration execution conditions are satisfied and concentration correction information is updated. In such a case, a printing apparatus according to the present invention, rather than using concentration correction information after update in generating print image data corresponding to the document in a third page, uses concentration correction information after update in generating print image data corresponding to a document after a fifth page, corresponding to a top page of print image data for 4-up printing shown as a reference number P2. Then, the printing apparatus prints one print image data for 4-up printing that is generated by aggregating print image data from the fifth page to an eighth page generated by using the concentration correction information after update.

This will make it possible that color tone of the images within a same print sheet are not stood out and differentiated. Note that, N-up printing in here is assumed to be executed based on print image data for N-up printing generated inside the printing apparatus, rather than being executed based on print image data for N-up printing generated by a printer driver or an application outside the printing apparatus.

Although, other various types of printing such as poster printing or color printing may be performed, description thereof will be given below.

Figure 2:
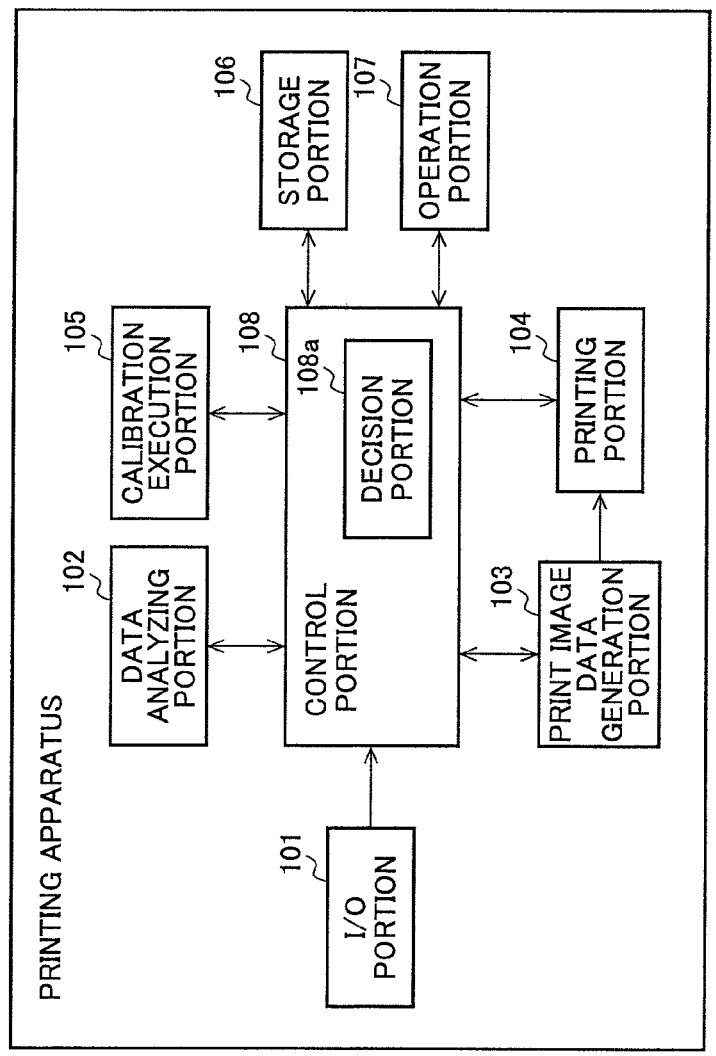
FIG. 2 is a functional block diagram of the printing apparatus according to the present invention.

FIG. 2 is a functional block diagram of a printing apparatus according to the present invention.

A printing apparatus 100 according to the present invention includes an I/O portion 101, a data analyzing portion 102, a print image data generation portion 103, a printing portion 104, a calibration execution portion 105, a storage portion 106, an operation portion 107, and a control portion 108.

The I/O portion 101 includes an interface function to connect with an external device such as a network, a USB and the like. The printing apparatus 100 receives an execution instruction for printing processing from a printer driver installed in a not-shown PC and receives print data transmitted from the PC. The print data is stored in a storage portion 106. The print data includes print setting information of N-up printing, poster printing and the like, in addition to PDL data described in a PDL.

The data analyzing portion 102 analyzes print setting information according to print data such as N-up printing, poster printing, color/monochrome mixed printing, multiple copy printing, saddle stitch printing, double-sided printing, normal single-sided printing, and the like from a content of the print data stored in the storage portion 106, and outputs to the print image data generation portion 103 and the control portion 108.

The print image data generation portion 103 generates print image data from the print data stored in the storage portion 106 using concentration correction information. For example, the print image data generation portion 103 extracts PDL data (print data) of 1 page included in the print data and develops the PDL data into a raster image to generate print image data of 1 page. In generating print image data of 1 page, concentration correction information before update or after update stored in the storage portion 106 is used.

Thereafter, the print image data generation portion 103 generates print image data corresponding to the print setting information obtained by the data analyzing portion 102 from the print image data of 1 page. For example, in the case of N-up printing, the print image data generation portion 103 generates print image data for N-up printing in which print image data of N pages are aggregated.

Note that, even in the case of poster printing, the print image data generation portion 103 creates print image data for poster printing. Similarly, even in the case of the saddle stitch printing, the print image data generation portion 103 creates print image data for saddle stitch printing. Note that, the saddle stitch printing means a function in which an original document is printed on both sides in 2-up so that each of the pages is laid out as a booklet when print sheets are folded in half.

The printing portion 104 is composed of a print component such as a photoreceptor drum and a control device for performing operation control of the print component, and executes printing processing based on print image data generated by the print image data generation portion 103.

The calibration execution portion 105 determines, for example, when the number of print sheets exceeds the specific number of sheets, when a drum rotational frequency exceeds a specific rotational frequency, when variation of temperature and humidity at an installation site of the printing apparatus 100 is large, and when an elapsed time from when a power source is turned on exceeds a specific time, that calibration execution conditions are satisfied, and executes calibration to update the concentration correction information for correcting an image concentration. The calibration execution portion 105 then stores in the storage portion 106 the concentration correction information after update that is updated by the execution of the calibration with the concentration correction information before renewal.

The storage portion 106 is composed of a hard disk device and a non-volatile memory, and stores print data, print setting information of the print data, concentration correction information before update, concentration correction information after update, a concentration correction information flag (also referred to as page information) to which is referred in deciding whether the concentration correction information after update or the concentration correction information before update is used at the time of generating print image data, and print image data. The storage portion 106 functions as a concentration correction information storage portion that stores the concentration correction information after update that is updated by execution of calibration and the concentration correction information before update.

Note that, description will be given for the concentration correction information flag below.

The operation portion 107 is composed of a hardware key, a touch panel and the like such as a copy execution key and a numerical key pad, and receives various instruction operations executed for the printing apparatus 100. The operation portion 107 functions as an operation portion that receives print setting information through a setting screen of FIG. 11 which will be described below.

The control portion 108 is provided with a function to count the number of pages of the print image data generated by the print image data generation portion 103, a function for detecting a color mode, specifically for detecting whether the print image data is in monochrome or in color, and the like, as well as controls each function block.

The decision portion 108a decides, when the calibration execution portion 105 executes calibration in executing print image data generation processing based on print setting information of N-up printing, poster printing and the like, whether the print image data of N-up printing, poster printing and the like is generated using the concentration correction information before update or the concentration correction information after update based on print setting information (analysis result) analyzed by the data analyzing portion 102. Here, the decision portion 108a decides whether generation of print image data of 1 page is performed using the concentration correction information before update or the concentration correction information after update.

Then, based on the decision result, the print image data generation portion 103 generates print image data of N-up printing, poster printing and the like.

Figure 3A:
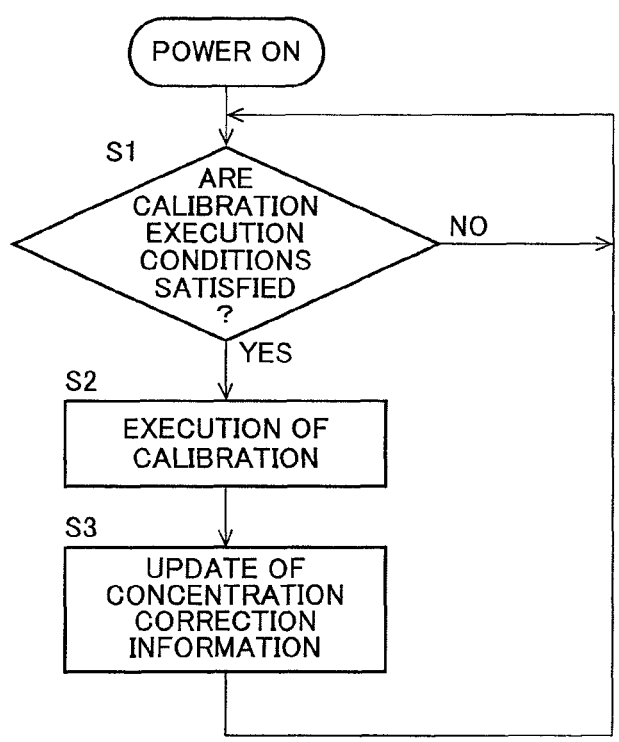
FIG. 3A is a flowchart explaining about calibration.
Figure 3B:
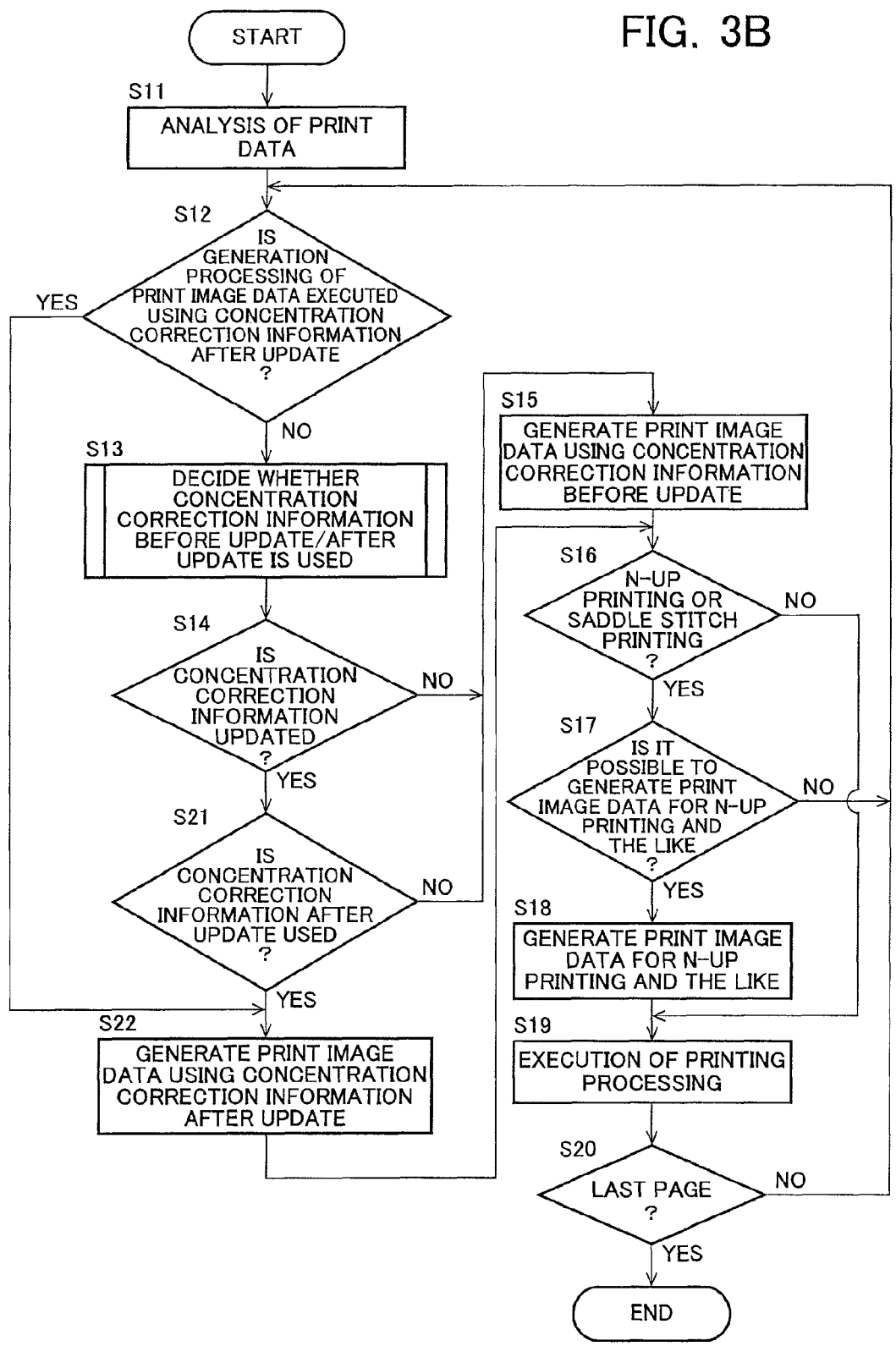
FIG. 3B is a flowchart explaining printing processing according to the present invention.

FIG. 3A and FIG. 3B are flowcharts for explaining processing executed in the printing apparatus 100, FIG. 3A is a flowchart for explaining calibration, and FIG. 3B is a flowchart for explaining printing processing according to the present invention.

When a power source of the printing apparatus is turned on, the calibration execution portion 105 determines whether or not calibration execution conditions are satisfied (step S1).

When the calibration execution conditions are not satisfied (NO at step S1), the calibration execution portion 105 repeats determinations until the calibration execution conditions are satisfied.

When the calibration execution conditions are satisfied (YES at step S1), the calibration execution portion 105 executes calibration (step S2), and updates the concentration correction information (step S3). At the time, the calibration execution portion 105 stores in the storage portion 106 the concentration correction information after update with the concentration correction information before update which has already been stored in the storage portion 106. The printing apparatus 100 repeats processing at steps S1 to S3 until the power source is turned off.

Next, description will be given for printing processing to be executed in the printing apparatus 100 with use of the flowchart of FIG. 3B.

Here, 4-up printing that has been explained in FIG. 1A and FIG. 1B is illustrated and described as printing processing to be executed, while other printing processing such as poster printing and the like will be described below.

In addition, it is normally rare that a plurality of times of calibrations are executed in executing one printing processing (print job), and in the following description, description will be thus given assuming a case where calibration is executed only once during execution of one print job.

When the printing apparatus 100 receives an execution instruction for printing processing from a printer driver installed in a not-shown PC and receives print data according to the printing processing through the I/O portion 101, the data analyzing portion 102 analyzes the print data and obtains print setting information included in the print data (step S11).

The print setting information is poster printing, N-up printing and the like, however, here, N-up printing is obtained as the print setting information.

Next, the control portion 108 determines whether or not generation processing of print image data has already been executed using the concentration correction information after update (step S12). Here, it is assumed that the calibration execution portion 105 has not executed calibration yet. When the calibration has not been executed, generation processing of print image data has not been executed using the concentration correction information after update (NO at step S12), and therefore the process goes to decision processing at step S13.

At step S13, the decision portion 108a of the control portion 108 decides whether print image data of 1 page is generated using the concentration correction information before update or the concentration correction information after update. At the time, the decision portion 108a, in the case of deciding to generate print image data using the concentration correction information after update, sets the concentration correction information flag to turning on, and in the case of deciding to generate print image data using the concentration correction information before update, sets the concentration correction information flag to turning off. Here, since 4-up printing is to be executed, the decision portion 108a sets the concentration correction information flag to turning on in the case of generating the print image data to be arranged on a top (upper left) of the print image data for 4-up printing, that is, in the case where the number of pages of the print image data to be created next is 1+multiples of 4, and turning off is set in other cases.

In examples of FIG. 1A and FIG. 1B, the decision portion 108a sets the concentration correction information flag to turning on when the number of pages of the print image data to be created next is 5 pages.

Note that, description will be given for the case where the printing processing is poster processing or the like with flowcharts of FIG. 10A to FIG. 10C.

Next, the control portion 108 determines whether the calibration execution portion 105 executes calibration and concentration correction information after update is newly stored in the storage portion 106, that is, whether or not the concentration correction information is updated (step S14). Here, the calibration execution portion 105 does not executes the calibration and therefore the concentration correction information is not updated (NO at step S14), and the process goes to step S15.

At step S15, the print image data generation portion 103 generates print image data using the concentration correction information before update. At the time, the print image data generation portion 103 stores the generated print image data in the storage portion 106.

Next, the control portion 108 determines whether the printing processing to be executed is N-up printing or saddle stitch printing (step S16).

When the printing processing is N-up printing or the saddle stitch printing (YES at step S16), the control portion 108 determines whether print image data for N-up printing or the saddle stitch printing is able to be generated (step S17). Here, since printing processing is 4-up printing, when the print image data of 4 pages is stored in the storage portion 106, the image data for 4-up printing is able to be generated, however, when the print image data of 4 pages is not stored in the storage portion 106, the image data for 4-up printing is not able to be generated.

When the print image data for N-up printing or the saddle stitch printing is able to be generated (YES at step S17), the print image data generation portion 103 generates the print image data for N-up printing or the saddle stitch printing (step S18), and the printing portion 104 executes printing processing of the print image data (step S19).

When the print image data for N-up printing or the saddle stitch printing is not able to be generated (NO at step S17), the process returns to step S12. In the case of not performing N-up printing or the saddle stitch printing (NO at step S16), the processing of steps S17 and S18 is omitted and the printing portion 104 executes printing processing of the print image data that has been already stored in the storage portion 106.

Assuming that currently, generation of print image data in a first page is finished and the print image data is stored in the storage portion 106. In this case, print image data for 4-up printing is not able to be generated (No at step S17), and therefore, the process returns to step S12 and the processing at steps S13 to S17 is executed for generating the print image data in a second page. As a result, the print image data in the second page is generated and stored in the storage portion 106.

After generating the print image data in the second page, the process returns to step S12 for generating the print image data in a third page, and subsequently decision processing at step S13 is executed. Here, the print image data in the third page is generated and the concentration correction information flag is thus set to turning off.

In addition, as explained in FIG. 1A and FIG. 1B, it is assumed that at the time of generating the print image data in the second page, the calibration execution portion 105 executes calibration (step S2 in FIG. 3A).

In this case, the concentration correction information is updated (YES at step S14) and the process thus goes to step S21.

At step S21, the control portion 108 determines whether concentration correction information before update or concentration correction information after update is used at the time of generating the print image data.

Specifically, the control portion 108 determines whether the concentration correction information flag is set to turning on or turning off.

Here, the concentration correction information flag is set to turning off, and the control portion 108 thus determines to use the concentration correction information before update at the time of generating the print image data (NO at step S21), and the print image data generation portion 103 generates the print image data in a third page using the concentration correction information before update (step S15). Then, the processing at steps S16 and S17 are executed. Next, the print image data generation portion 103 executes generation processing of the print image data in a fourth page, however, the processing is the same as the generation processing of the print image data in the third page, which description is thus omitted.

When the generation processing of the print image data in the fourth page (step S15) is finished, print image data of 4 pages is stored in the storage portion 106 and the print image data for N-up printing is able to be generated (YES at step S17) and the print image data generation portion 103 thus generates the print image data for N-up printing in which the print image data of 4 pages are aggregated (step S18), and the printing portion 104 prints the print image data for N-up printing (step S19). When printing processing of 1 page is executed, the control portion 108 determines whether or not the printed page is a last page (step S20), and in the case of not the last page (NO at step S20), the process returns to step S12.

Note that, in the case of being the last page (YES at step S20), the printing processing is finished.

Here, since it has not come to the last page yet, the process then returns to step S12, and generation processing of the print image data in a fifth page is started, however, as described above, the generation processing of the print image data using the concentration correction information has not yet been executed (NO at step S12), and the decision processing at step S13 is thus executed.

At the time, the number of pages of the print image data to be generated next is 1+multiples of 4 (5 pages), and therefore, at step S13, the decision portion 108a decides to generate the print image data in the fifth page using the concentration correction information after update and sets the concentration correction information to turning on.

As described above, the calibration execution portion 105 has already executed the calibration so that the concentration correction information is updated (YES at step S14), and therefore, the process goes to the determining processing at step S21.

At step S21, the control portion 108 determines, for print image data to be generated next, whether or not concentration correction information after update is used. Here, at step S13, it has been already decided that generation processing of the print image data in the fifth page is executed using the concentration correction information after update (concentration correction information is set to turning on), and the control portion 108 thus determines, for print image data to be generated, to use the concentration correction information after update (YES at step S21), and the print image data generation portion 103 generates the print image data in a fifth page using the concentration correction information after update (step S22).

Next, after executing the processing at steps S16 and S17, returning to step S12, generation processing of the print image data in a sixth page is started, and as described above, generation processing of the print image data has already been executed using the concentration correction information after update (YES at step S12), and therefore, the print image data generation portion 103 executes generation processing of the print image data in the sixth page using the concentration correction information after update (step S22).

Next, after executing the processing at steps S16 and S17, returning to step S12, the print image data generation portion 103 executes generation processing of the print image data in a seventh page and eighth page using the concentration correction information after update as with the processing in the sixth page.

When the generation processing of the print image data in the fifth page to eighth page is finished, the print image data of 4 pages is stored in the storage portion 106 and print image data for N-up printing is able to be generated (YES at step S17), and therefore, the print image data generation portion 103 generates the print image data for N-up printing in which the print image data of 4 pages is aggregated (step S18), and the printing portion 104 prints the print image data for N-up printing (step S19).

The printed page is the last page (YES at step S20), and the printing processing is thus finished.

Printing is performed in such a manner, whereby there is no printing of the images whose color tones are different from each other in the same print sheet, and change in the color tone is thus able to be made inconspicuous for a user.

Next, description will be schematically given for other printing processing that is executed in the printing apparatus 100 of the present invention with use of FIG. 4A to FIG. 9.

Figure 4A:
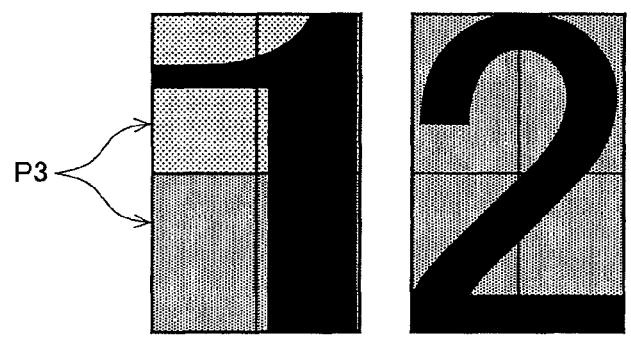
FIG. 4A and FIG. 4B are diagrams showing an example of printing processing to be executed in the printing apparatus of the present invention at the time of poster printing.
Figure 4B:
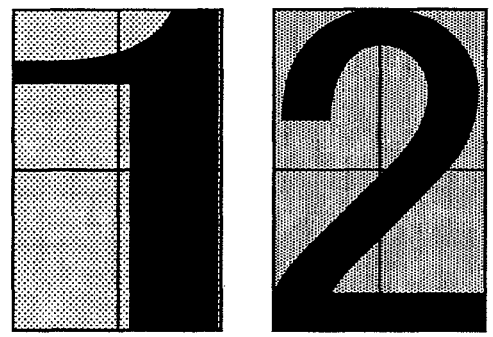

FIG. 4A and FIG. 4B are diagrams showing an example of printing processing that is executed in the printing apparatus 100 in poster printing. Here, the poster printing means that print image data corresponding to a document of 1 page is enlarged, and the enlarged print image data is printed by dividing into M×N. Note that, the print image data corresponding to the document of 1 page may be divided into M×N to perform enlarged printing of the divided print image data.

For example, when a document of 2 pages in which '1' and '2' are described is printed as a poster in 2×2 (in the order of upper left, upper right, lower left, lower right), a content of the document is divided into 2×2 to be printed onto sheets of 8 pages in total, respectively. Here, for example, in execution of the poster printing processing, it is assumed that the print image data in the second page is generated, thereafter satisfying calibration execution conditions, and concentration correction information is updated. In this case, when the print image data is generated with use of concentration correction information after update from a third page, as indicated by a reference number P3 of FIG. 4A, images whose color tones are different from each other are included in the same poster, and a difference of color tones is thus stood out.

Consequently, in the printing apparatus 100, even in a case where concentration correction information is updated after the print image data in the second page is generated, when the print image data in the fifth page that is a top page of a next poster is generated, without starting from a third page, the concentration correction information after update is used so that color tones in the same poster is not stood out and differentiated as shown in FIG. 4B.

Figure 5A:
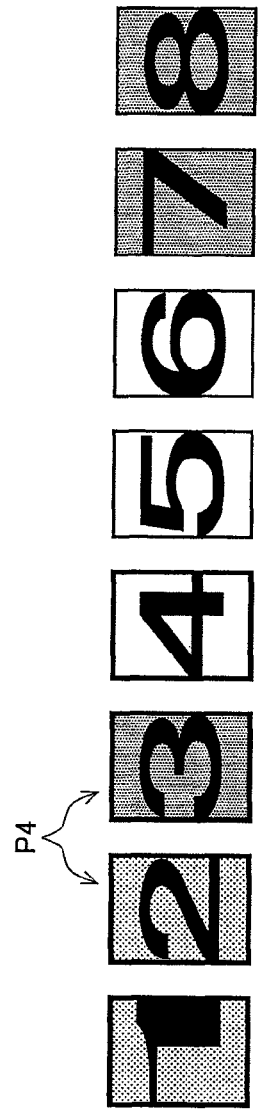
FIG. 5A and FIG. 5B are diagrams showing an example of printing processing to be executed in the printing apparatus of the present invention at the time of color/monochrome mixed printing.
Figure 5B:
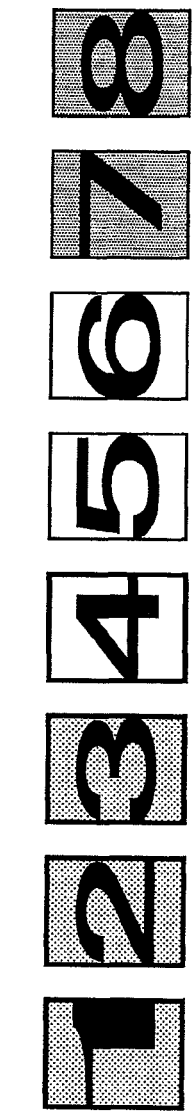

FIG. 5A and FIG. 5B are diagrams showing an example of printing processing that is executed in the printing apparatus 100 in color/monochrome mixed printing.

As shown in FIG. 5A, in printing processing of color print image data in first, second and third pages, monochrome print image data in fourth, fifth and sixth pages and color printing image data in seventh and eighth pages, it is assumed that the calibration execution conditions are satisfied after the print image data in the second page is generated and concentration correction information is updated. In this case, when print image data is generated with use of the concentration correction information after update from the third page, as indicated by a reference number P4 of FIG. 5A, in color documents, a color tone in the second page is different from a color tone in the third page so that images whose color tones are different from each other are continued in a series of color printing pages, and a difference of color tones is stood out.

Consequently, in the printing apparatus 100, even in a case where the concentration correction information is updated after the print image data in the second page is generated, when the print image data in the fourth page that is a page whose color modes are different from each other is generated, without starting from the third page, concentration correction information after update is used so that color tones are not stood out and differentiated as shown in FIG. 5B.

FIG. 6A and FIG. 6B are diagrams showing an example of printing processing that is executed in the printing apparatus 100 in multiple copy printing.

It is assumed that multiple copy printing is performed for a document of N pages in copy unit. For example, it is assumed to print 3 copies of the document of 1 to 3 pages in copy unit. At the time, print image data of 3 pages corresponding to the document from the first to third pages is generated. Further, it is assumed that the calibration execution conditions are satisfied and the concentration correction information is updated after the print image data in the second page is generated. In this case, when the print image data is generated with use of concentration correction information after update from the third page, as indicated by a reference number P5 of FIG. 6A, images whose color tones are different from each other is included in the same copy, and a difference of color tones is thus stood out. Additionally, in the case of multiple copy printing, it is considered that print image data that is generated in a first copy is also used after a second copy so that images whose color tones are different from each other are included in all copies.

Consequently, in the printing apparatus 100, even in a case where the concentration correction information is updated after the print image data in the second page is generated, the concentration correction information after update from the third page is not used, and the concentration correction information after update is used when the print image data in the first page of a next copy (fourth page from the beginning) is generated, so that images whose color tones are different from each other are not included in the same copy and color tones are not stood out and differentiated as shown in FIG. 6B. Additionally, with the printing apparatus 100, after a third copy, the print image data in the second copy created with use of the concentration correction information after update is printed so that a change of color tones is able to be minimized.

Figure 7B:
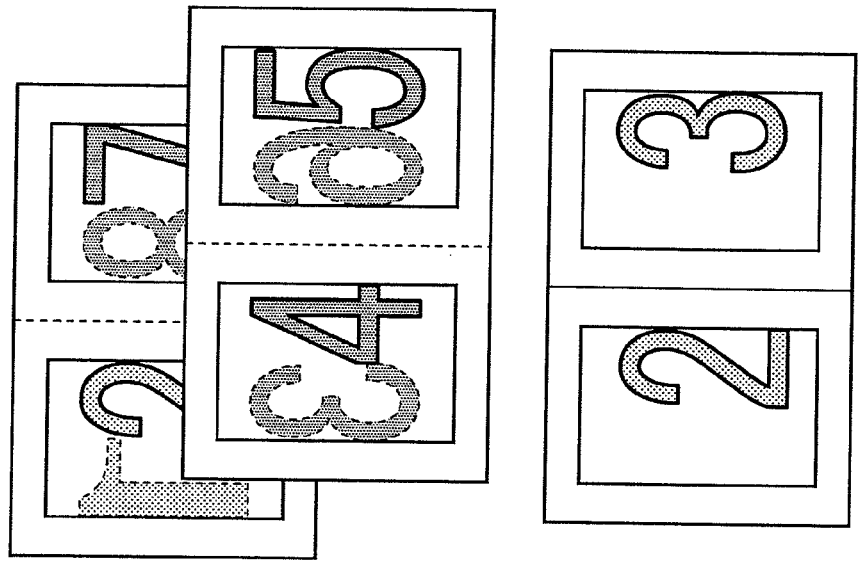
FIG. 7A and FIG. 7B are diagrams showing an example of printing processing to be executed in the printing apparatus of the present invention at the time of saddle stitch printing.
Figure 7A:
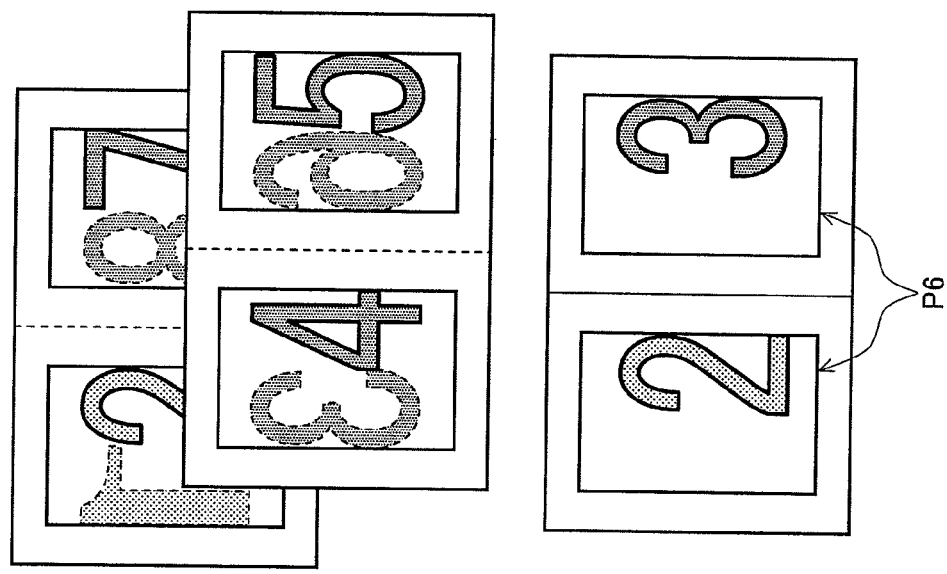

FIG. 7A and FIG. 7B are diagrams showing an example of printing processing that is executed in the printing apparatus 100 at the time of saddle stitch printing.

As shown in FIG. 7A, when saddle stitch printing is performed for print image data corresponding to a document of 8 pages in which '1' to '8' are described, a content of the document is printed in 2-up on both sides of a sheet of two pages in total. Numerals described by dotted lines mean to be images printed on a back face of a sheet. A booklet is obtained from the sheet which is folded at a dotted line region in the center of the sheet.

Here, for example, in execution of the saddle stitch printing processing, it is assumed that the calibration execution conditions are satisfied and the concentration correction information is updated after the print image data in the second page is generated. In this case, when the print image data is generated with use of the concentration correction information after update from the third page, as indicated by a reference number P6 of FIG. 7A, in the case of spreading one sheet with images in the first page of the booklet up, images in the second page and images in the third page whose color tones are different from each other are included in the same spread, and a difference of color tones is thus stood out.

Consequently, in the printing apparatus 100, even in a case where the concentration correction information is updated after the print image data in the second page is generated, when the print image data in the fourth page that is a first page of a next spread is generated, without starting from the third page, the concentration correction information after update is used so that color tones are not stood out and differentiated as shown in FIG. 7B. Note that, here, saddle stitch printing is not executed based on print image data for saddle stitch printing that is generated by means of a printer driver or an application outside a printing apparatus, but is executed based on print image data for saddle stitch printing that is generated inside the printing apparatus.

Figure 8A:
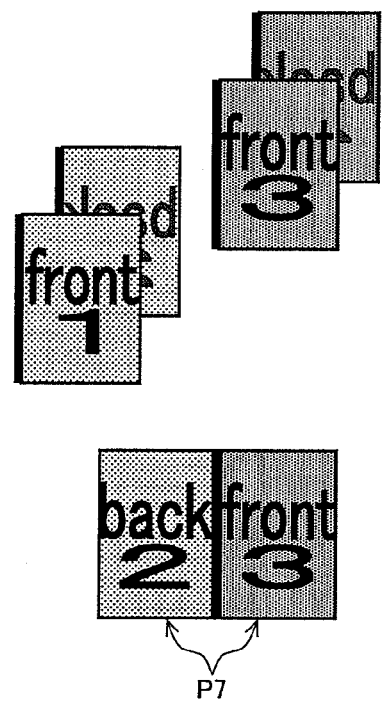
FIG. 8A and FIG. 8B are diagrams showing an example of printing processing to be executed in the printing apparatus of the present invention at the time of double-sided printing.
Figure 8B:
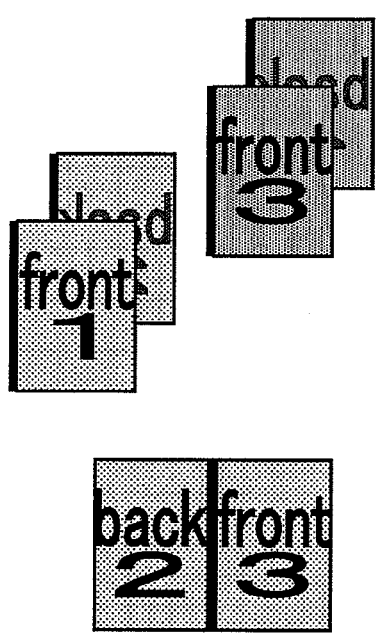

FIG. 8A and FIG. 8B are diagrams showing an example of printing processing executed in the printing apparatus 100 in double-sided printing.

As shown in FIG. 8A, when double-sided printing (left-side binding) is performed for a document of 4 pages, double-sided printing is performed for a content of the document on front faces and back faces of sheets of 2 pages in total. Characters explained in gray in the diagram means to be an image printed on the back face of the sheet. Here, for example, in execution of the double-sided printing processing, it is assumed that calibration execution conditions are satisfied after the print image data in the second page is generated, and the concentration correction information is updated. In this case, when print image data is generated using the concentration correction information after update from the third page, as indicated by a reference number P7 of FIG. 8A, images whose color tones are different from each other is printed on a back face of the first sheet (second page) and a front face of the second sheet (third page) that come to the same spread, and a difference of color tones is thus stood out at the time of laying two sheets to be spread in left-side binding.

Consequently, in the printing apparatus 100, even in a case where the concentration correction information is updated after the print image data in the second page is generated, when the print image data on a back face in a second sheet (fourth page) that is a first page of a next spread is generated, without starting from the third page, the concentration correction information after update is used so that color tones are not stood out and differentiated in a spread state as shown in FIG. 8B.

Figure 9:
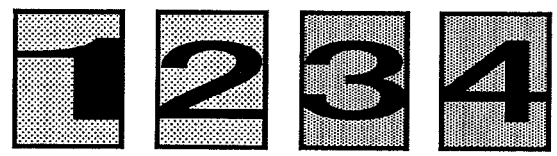
FIG. 9 is a diagram showing an example of printing processing to be executed in the printing apparatus of the present invention at the time of normal single-sided printing.

FIG. 9 is a diagram showing an example of printing processing that is executed in the printing apparatus 100 in normal single-sided printing other than the above-described print settings. As shown in FIG. 9, when a document of 4 pages is printed, for example, it is assumed that calibration execution conditions are satisfied and the concentration correction information is updated after the print image data in the second page is generated. In this case, the printing apparatus 100 generates print image data using concentration correction information after update from the third page. This makes it possible to reflect the concentration correction information after update immediately in normal printing.

Figure 10A:
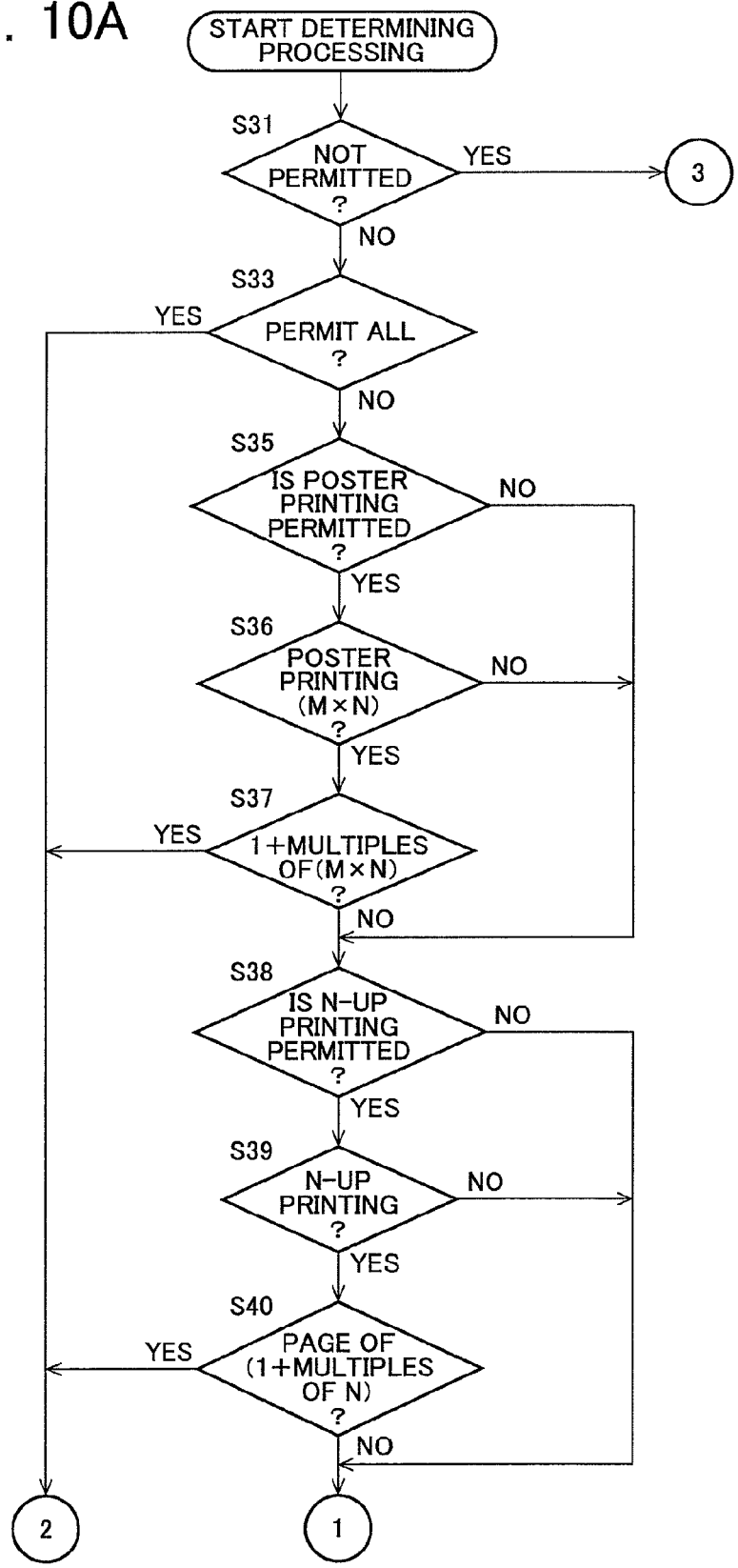
FIG. 10A is a first flowchart explaining printing processing according to the present invention.
Figure 10B:
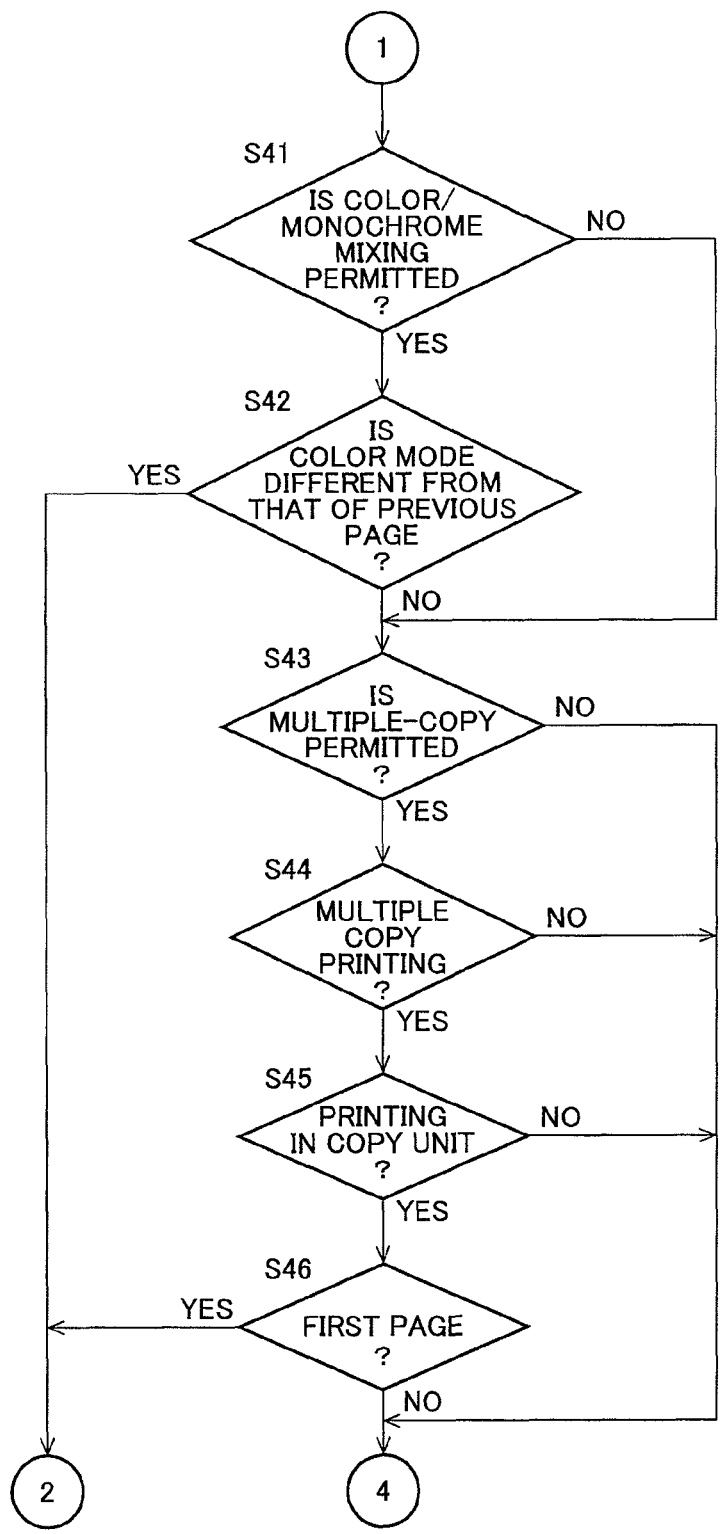
FIG. 10B is a second flowchart explaining printing processing according to the present invention.
Figure 10C:
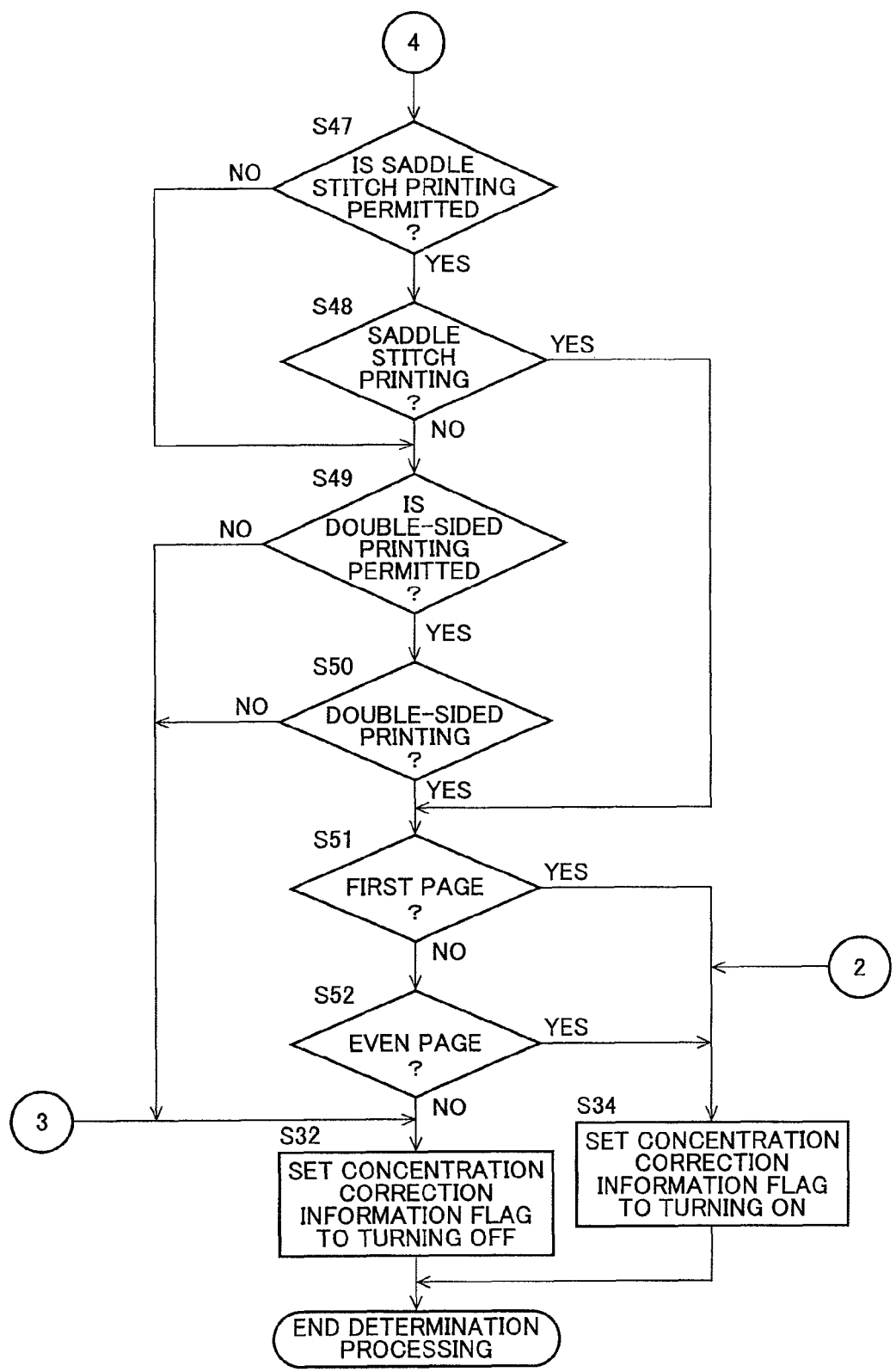
FIG. 10C is a third flowchart explaining printing processing according to the present invention.

FIG. 10A to FIG. 10C are flowcharts explaining processing that is executed in the printing apparatus 100 in the case of executing printing processing such as N-up printing and poster printing explained in FIG. 1 and FIG. 4A to FIG. 9.

These flowcharts are flowcharts corresponding to processing of deciding whether printing processing is executed using the concentration correction information before update, or printing processing is executed using the concentration correction information after update, and to describe in detail processing that is executed at step S13 of FIG. 3B.

When a user does not permit, in execution of printing processing, to generate print image data (execution of printing processing) using the concentration correction information after update (YES at step S31), the decision portion 108a sets a concentration correction information flag to turning off and finishes the processing (step S32 of FIG. 10C).

For example, a user is, in execution of printing processing, able to give instructions to the printing apparatus 100 on approval/disapproval for generating the print image data using the concentration correction information after update, through a display panel of the operation portion 107 or a setting screen that is displayed on a browser capable of remotely accessing.

FIG. 11 is a diagram showing an example of this setting screen, and when the user turns on a radio button of "Spacing between pages is not permitted" of FIG. 11, the printing apparatus 100 does not generate the print image data using the concentration correction information after update while executing printing processing. The user is able to designate an update timing of concentration correction information for each printing processing through the screen.

When the user turns on the radio buttons of "Spacing between pages is permitted" and "Permit all" on the setting screen shown in FIG. 11, that is, when it is unconditionally permitted to generate the print image data using the concentration correction information after update (YES at step S33), the decision portion 108a sets the concentration correction information flag to turning on (step S34 of FIG. 10C).

When the user turns on a check box of "Poster printing" on the setting screen shown in FIG. 11, that is, when it is permitted in the poster printing to execute printing processing using the concentration correction information after update (YES at step S35), the control portion 108 determines whether or not printing processing is poster printing (M×N division) (step S36). In the case of poster printing (YES at step S36), the decision portion 108a determines whether or not a page in which the print image data is generated is a page of (1+multiples of (M×N)) (step S37).

For example, in the case of 2×2 poster printing, a first page (1+(2×2)×0), a fifth page (1+(2×2)×1), a ninth page (1+(2×2)×2), etc. correspond to this condition, and in this case (YES at step S37), the decision portion 108a sets the concentration correction information flag to turning on (step S34 of FIG. 10C). Namely, the decision portion 108a decides, in a case where the number of pages of print image data to be printed after calibration execution is 1+multiples of (M×N), that print image data for poster printing is generated using the concentration correction information after update.

In this manner, only in a case where print setting information indicating poster printing received through the operation portion 107 by turning on the check box of "Poster printing" showing print setting information on a setting screen shown in FIG. 11 is the same as print setting information (poster printing) of print data, the decision portion 108a executes the determination.

In poster printing, in a case where it is not permitted to execute printing processing using the concentration correction information after update (NO at step S35), in a case where printing is not set to poster printing (NO at step S36), and in the case of poster printing but not an appropriate page (NO at step S37), the process goes to determination of a next print setting.

When the user turns on a check box of "N-up printing" on the setting screen shown in FIG. 11, that is, when it is permitted in N-up printing to execute printing processing using the concentration correction information after update (YES at step S38), the control portion 108 determines whether or not printing processing is N-up printing (step S39). In the case of N-up printing (YES at step S39), the decision portion 108a determines whether or not a page in which the print image data is next generated is a page of (1+multiples of N) (step S40).

For example, in the case of 4-up printing, a first page (1+4×0), a fifth page (1+4×1), a ninth page (1+4×2), etc. correspond to this condition, and in this case (YES at step S40), the decision portion 108a sets the concentration correction information flag to turning on (step S34 of FIG. 10C). Namely, the decision portion 108a decides, in a case where the number of pages of the print image data to be generated after calibration execution is 1+multiples of N, to generate print image data for N-up printing using the concentration correction information after update.

In this manner, only in a case where print setting information indicating N-up printing received through the operation portion 107 by turning on the check box of "N-up printing" showing print setting information on the setting screen shown in FIG. 11 is the same as print setting information (N-up printing) of print data, the decision portion 108a executes the determination.

In N-up printing, in a case where it is not permitted to execute printing processing using the concentration correction information after update (NO at step S38), in a case where printing is not set to N-up printing (NO at step S39), and in the case of N-up printing but not an appropriate page (NO at step S40), the process goes to determination of a next print setting shown in FIG. 10B.

When the user turns on a check box of "Color/monochrome mixing" on the setting screen shown in FIG. 11, that is, when it is permitted to execute printing processing for a color/monochrome mixed document using the concentration correction information after update (YES at step S41), the control portion 108 determines whether or not color modes are different from each other by comparing a color mode (color or monochrome) of a page in which the print image data is next generated to a color mode of a previous page (step S42). In the case of being different (YES at step S42), the concentration correction information flag is turned on (step S34 of FIG. 10C).

Namely, the decision portion 108a decides, in a case where a color mode of the print image data to be generated after calibration execution is different from a color mode of print image data generated on the previous page, to generate the print image data for color/monochrome mixed printing using the concentration correction information after update.

In this manner, only in a case where the check box of "Color/monochrome mixing" indicating print setting information on the setting screen shown in FIG. 11 is turned on, whereby the print setting information indicating the color/monochrome mixed printing received through the operation portion 107 is the same as the print setting information (color/monochrome mixed printing) of print data, the decision portion 108a executes the determination.

In a case where it is not permitted to execute printing processing using the concentration correction information after update in the color/monochrome mixed document (NO at step S41), and in the case of color continuous printing or monochrome continuous printing (NO at step S42), the process goes to determination of a next print setting.

When a user turns on a check box of "Copy number" on the setting screen shown in FIG. 11, that is, when it is permitted to execute printing processing using the concentration correction information after update in multiple copy printing in which multiple copy printing is performed for a document of N pages in copy unit (YES at step S43), the control portion 108 determines whether or not printing processing is multiple copy printing (step S44). In the case of multiple copy printing (YES at step S44), the control portion 108 determines whether or not to be printing in copy unit (step S45). In the case of printing in copy unit (YES at step S45), the decision portion 108a determines whether or not a page in which the print image data is next generated is a first page in copy unit (step S46), and in the case of the first page (YES at step S46), the concentration correction information flag is set to turning on (step S34 of FIG. 10C).

Namely, the decision portion 108a decides to generate the print image data for multiple copy printing using the concentration correction information after update from a top page of a next copy.

In this manner, only in a case where the check box of "Copy number" indicating print setting information on the setting screen shown in FIG. 11 is turned on, whereby the print setting information received through the operation portion 107 is the same as the print setting information (multiple copy printing) of print data, the decision portion 108a executes the determination.

In a case where it is not permitted to execute printing processing using the concentration correction information after update in multiple copy printing (NO at step S43), in a case where printing is not set to multiple copy printing (NO at step S44), in the case of multiple copy printing but not printing in copy unit (NO at step S45), and in the case of multiple copy printing but not the first page in copy unit (NO at step S46), the process goes to determination of a next print setting shown in FIG. 10C.

When the user turns on a check box of "Saddle stitch printing" on the setting screen shown in FIG. 11, that is, when it is permitted in saddle stitch printing to execute printing processing using the concentration correction information after update (YES at step S47), the control portion 108 determines whether or not printing processing is saddle stitch printing (step S48). In the case of saddle stitch printing (YES at step S48), the decision portion 108a determines whether a page in which the print image data is next generated is a first page (step S51), and whether or not to be an even page (step S52). In the case of the first page (YES at step S51) or the even page (YES at step S52), the decision portion 108a sets the concentration correction information flag to turning on (step S34).

Namely, the decision portion 108a decides, in a case where the number of pages of the print image data to be generated after calibration execution is 1 page or an even number, to generate the print image data for saddle stitch printing using the concentration correction information after update.

In this manner, only in a case where the check box of "Saddle stitch printing" indicating print setting information on the setting screen shown in FIG. 11 is turned on, whereby the print setting information indicating poster printing received through the operation portion 107 is the same as the print setting information (saddle stitch printing) of print data, the decision portion 108a executes the determination.

In a case where it is not permitted to execute printing processing using the concentration correction information after update in saddle stitch printing (NO at step S47), and in a case where printing is not set to the saddle stitch printing (NO at step S48), the process goes to determination of a next print setting. In the case of an odd page other than the first page (NO at step S52), the decision portion 108a sets the concentration correction information flag to turning off, and finishes the processing (step S32).

When the user turns on a check box of "Double-sided printing" on the setting screen shown in FIG. 11, that is, when it is permitted in double-sided printing to execute printing processing using the concentration correction information after update (YES at step S49), the control portion 108 determines whether or not the printing processing is double-sided printing (step S50). In the case of double-sided printing (YES at step S50), the decision portion 108a determines whether a page in which the print image data is next generated is a first page (step S51), and whether or not to be an even page (step S52).

In the case of the first page (YES at step S51) or the even page (YES at step S52), the decision portion 108a sets the concentration correction information flag to turning on (step S34).

Namely, the decision portion 108a decides, in a case where the number of pages of the print image data to be generated after calibration execution is 1 page or an even number, to generate the print image data for double-sided printing using the concentration correction information after update.

In this manner, only in a case where the check box of "Double-sided printing" indicating print setting information on the setting screen shown in FIG. 11 is turned on, whereby the print setting information received through the operation portion 107 is the same as the print setting information (double-sided printing) of print data, the decision portion 108a executes the determination.

In a case where it is not permitted to execute printing processing using the concentration correction information after update in double-sided printing (NO at step S49), in a case where printing is not set to double-sided printing (NO at step S50), and in the case of an odd page other than the first page (NO at step S52), the concentration correction information flag is set to turning off, and the processing is finished (step S32).

Note that, when print setting information of print data is normal single-sided printing, the decision portion 108a decides to generate print image data for single-sided printing using the concentration correction information after update from among the print image data to be generated after calibration execution.

When the above-described processing at steps S31 to S52 is finished, the printing apparatus 100 comes to execute processing of step S14 explained in FIG. 3B.

This allows a difference of color tones of printed materials not to be stood out and differentiated even in the case of executing various printing processing such as N-up printing and poster printing.

Further, it is possible to set for each user so as not to use the concentration correction information after update since a difference of color tones is stood out when print image data for N-up printing and poster printing is generated using the concentration correction information after update, and to set for each user so as to use the concentration correction information after update in any pages because of paying no attention to the difference of color tones in other cases except double-sided printing and the like.

Example 2

In Example 1, one print image data was generated, and thereafter the print image data was printed immediately. For example, generation processing of image data for 4-up printing was finished, and thereafter the print image data was able to be printed immediately. However, when a generation processing speed of print image data is faster than a printing processing speed so as not to make printing of the print image data in time, there is a case where the print image data is generated in advance to be stored in a storage portion in the order of generation, and thereafter a plurality of the stored print image data are printed sequentially. Hereinafter, description will be given for use of the concentration correction information before and after update in such sequential printing.

Figure 12A:
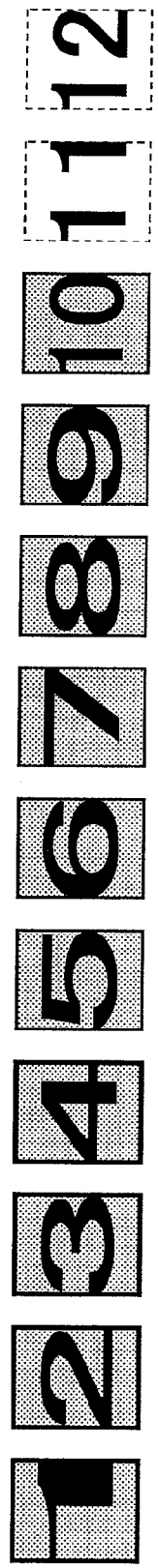
FIG. 12A to FIG. 12C are diagrams explaining use of concentration correction information before and after update when a plurality of print image data is printed sequentially.
Figure 12B:
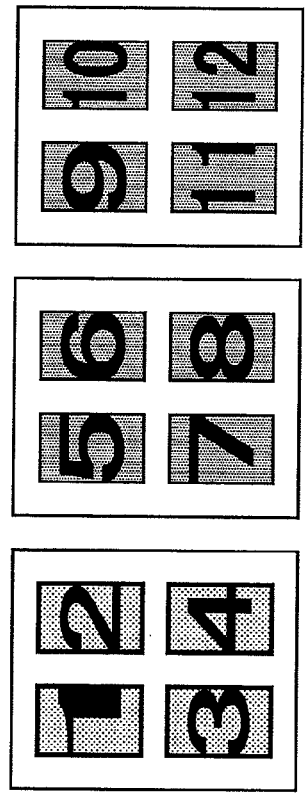
Figure 12C:
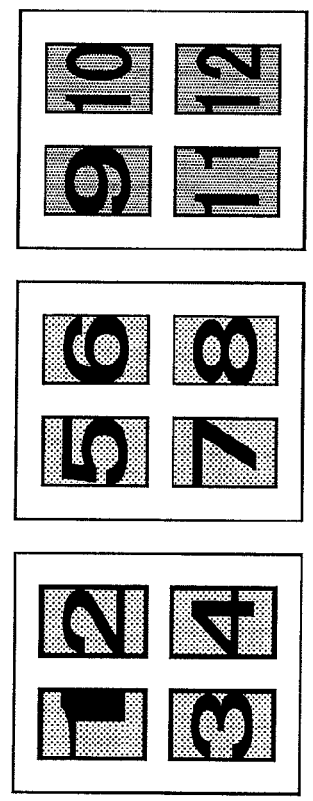

FIG. 12A to FIG. 12C are diagrams explaining use of concentration correction information before and after update when a plurality of print image data is printed sequentially.

FIG. 12A is a diagram explaining a generation state of print image data corresponding to a document of 12 pages in certain timing. Here, pages indicated by heavy lines (1 to 4 pages) are pages in which printing processing is finished, pages indicated by thin lines (5 to 10) show print image data that is generated using concentration correction information before update, and pages indicated by dot lines (11 and 12) show pages in which print image data is not generated.

FIG. 12B and FIG. 12C are diagrams showing print image data for 4-up printing to be generated in the case of performing 4-up printing (in the order of top left, top right, lower left, lower right) of the print image data shown in FIG. 12A.

In a state shown in FIG. 12A, when printing up to a fourth page (first page in N-up printing) is finished, execution processing of generation processing of print image data of 5 to 10 pages has already been finished in advance.

Here, it is assumed that, at the time of finishing generation of the print image data in a tenth page, execution conditions of calibration are satisfied, and the concentration correction information is updated. In this case, description will be given for execution of processing for generating print image data again (hereinafter, indicated as re-RIP) using the concentration correction information after update with respect to print image data that has already been created.

In the case of FIG. 12A, print image data of 5 to 10 pages has already been generated. Among the print image data, print image data intended for re-RIP is, as explained in Example 1, print image data after the fifth-page print image data, or print image data after the ninth-page print image data, which corresponds to a top page of print image data for 4-up printing.

The fifth-page print image data corresponds to a top page of the print image data for 4-up printing in the second page as shown in FIG. 12B, and when print image data is generated from this page using the concentration correction information after update, the print image data as shown in FIG. 12B is generated.

Similarly, the ninth-page print image data corresponds to a top page of print image data for 4-up printing in the third page shown in FIG. 12C, and when the print image data is generated from this page using the concentration correction information after update, the print image data as shown in FIG. 12C is generated.

Determination on whether re-RIP is executed for the print image data after the fifth page, or re-RIP is executed for the print image data after the ninth page depends on executing with improvement of printing image quality, or executing with an increased processing speed of generation of print image data.

When re-RIP is executed for the print image data after the fifth page, the print image data is immediately generated using the concentration correction information after update so that printing image quality is improved. Namely, by means of the re-RIP, the concentration correction information after update is immediately reflected in print image data so that printing image quality is improved.

When re-RIP is executed for the print image data in the ninth and tenth pages, it is possible to increase the processing speed without wasting the generated print image data. In this case, since re-RIP is performed only for ninth and tenth pages, the number of print image data for which re-RIP is performed is lessened, so that it is possible to suppress a processing time to the minimum.

In order to execute such re-RIP, the printing apparatus 100 is provided with the following functions.

The storage portion 106 is provided with a function for storing print image data for each page generated by the print image data generation portion 103 in the order of generation.

The operation portion 107 is provided with a function for receiving an instruction operation on whether printing is performed by giving priority to image quality, or printing is performed by giving priority to a speed, before printing processing execution. A user executes such an instruction operation through a screen shown in FIG. 11. For such an instruction operation, description will be given in flowcharts of FIG. 13A and FIG. 13B.

The control portion 108 is provided with a function for selecting print image data to be newly generated using the concentration correction information after update, that is, print image data intended for re-RIP, from among print image data stored in the storage portion 106 (print image data storage portion) based on a content instructed by the operation portion 107 and an analysis result of print data analyzed by the data analyzing portion 102, when the calibration execution portion 105 executes calibration while executing print image data generation processing based on print setting information such as N-up printing and poster printing.

Further, the control portion 108 is provided with a function for detecting an operation state of the printing portion 104 to detect whether the printing portion 104 does not execute printing processing of print image data or is executing the printing processing.

The print image data generation portion 103 is provided with a function for generating print image data such as N-up printing and poster printing using the concentration correction information after update based on selection of the control portion 108.

Figure 13A:
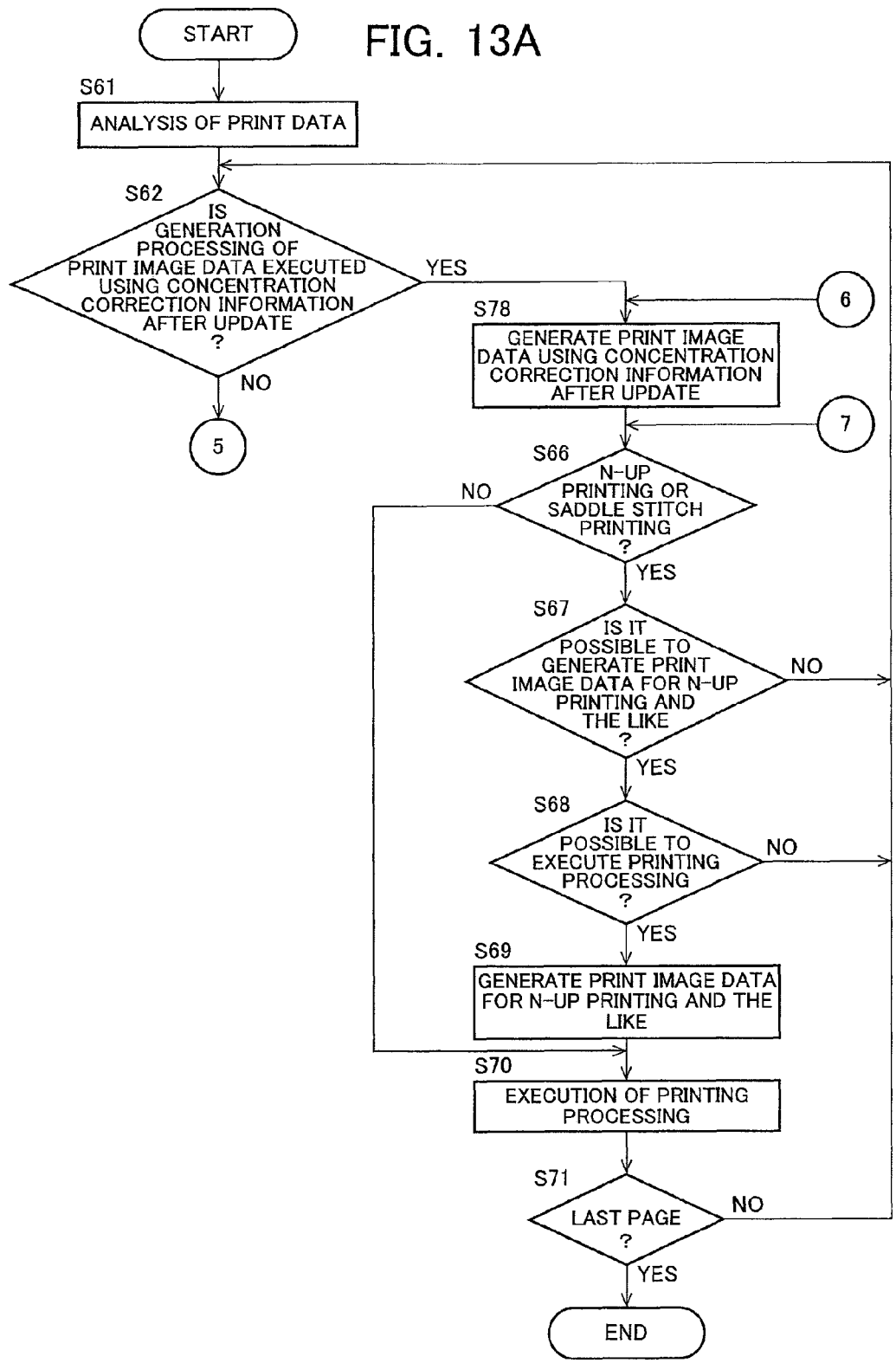
FIG. 13A is a first flowchart explaining processing of printing sequentially a plurality of print image data according to the present invention.
Figure 13B:
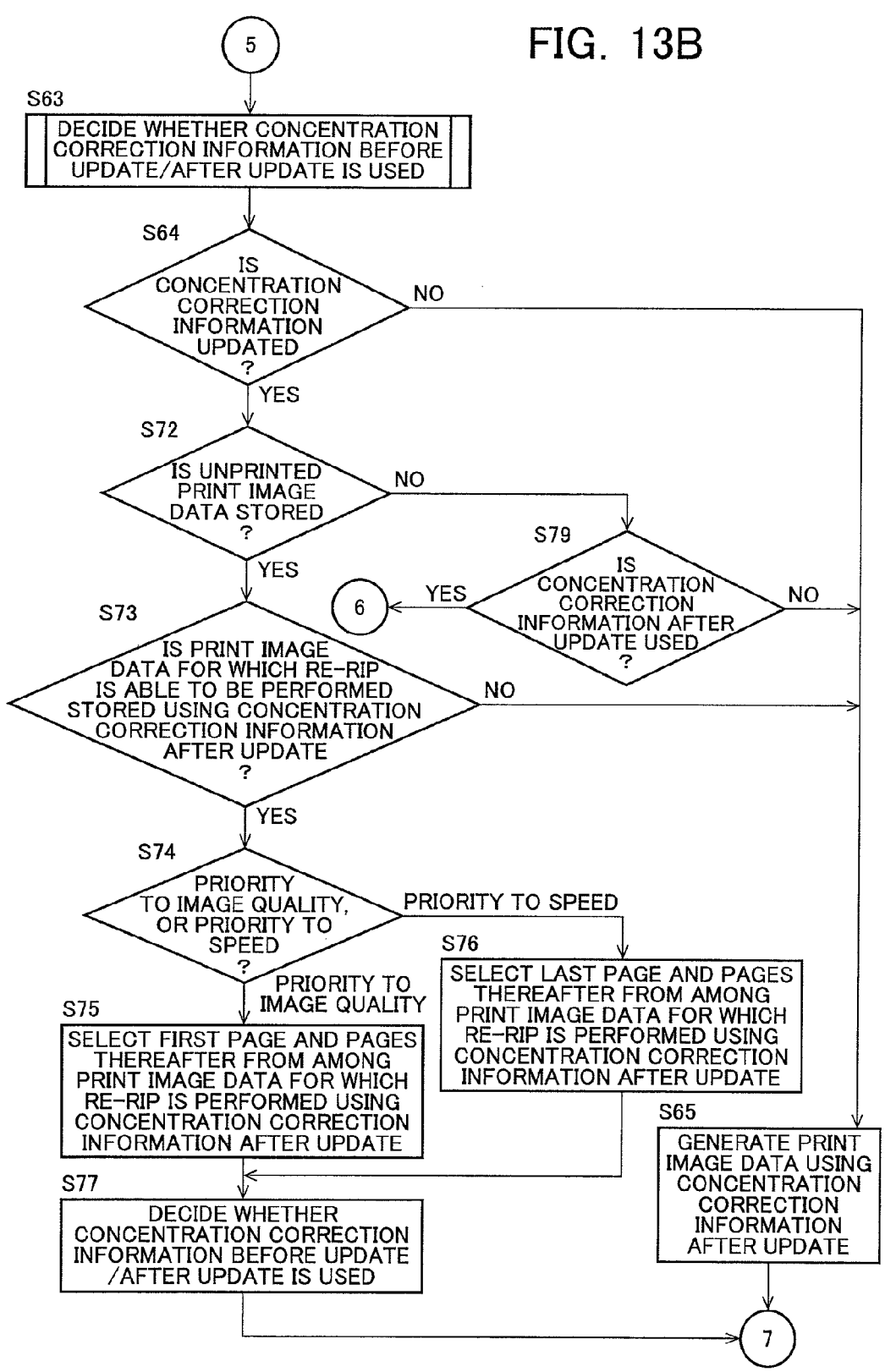
FIG. 13B is a second flowchart explaining processing of printing sequentially a plurality of print image data according to the present invention.
Figure 14A:
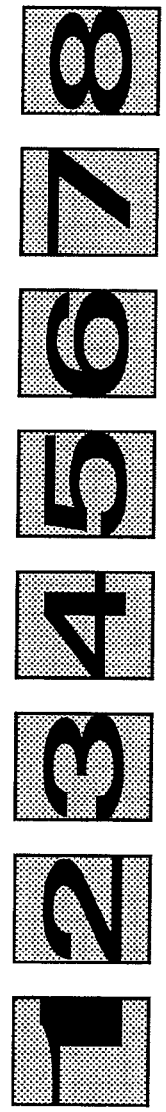
FIG. 14A and FIG. 14B are diagrams specifically explaining a problem in a conventional printing apparatus.
Figure 14B:
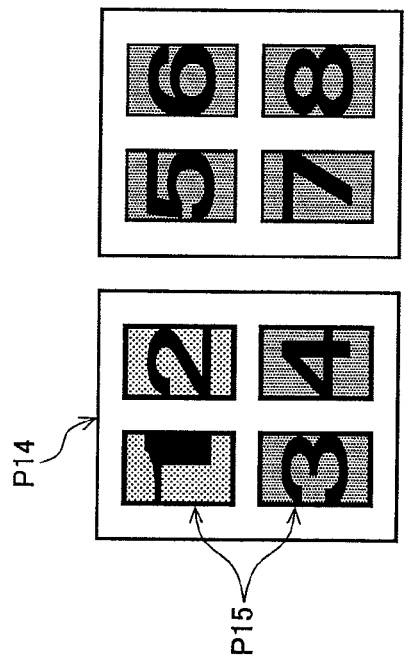

FIG. 13A and FIG. 13B are flowcharts for explaining processing for executing such re-RIP. Hereinafter, description will be given for re-RIP with reference to FIG. 12A to FIG. 12C.

When the printing apparatus 100 receives an execution instruction for printing processing from a printer driver installed in a not shown PC, and receives print data concerning the printing processing through the I/O portion 101, the data analyzing portion 102 analyzes the print data to obtain print setting information included in the print data (step S61). Here, N-up printing is obtained as print setting information.

Next, the control portion 108 determines whether or not generation processing of print image data has already been executed using the concentration correction information after update (step S62). Here, it is assumed that the calibration execution portion 105 has not yet executed calibration. Unless calibration is executed, the generation processing of print image data is not executed using the concentration correction information after update (NO at step S62), and the process thus goes to determination processing at step S63 of FIG. 13B. Note that, the step S63 is the same as the step S13 of FIG. 3B (flowcharts of FIG. 10A to FIG. 10C).

At step S63, the decision portion 108a of the control portion 108 decides whether print image data of 1 page is generated using concentration correction information before update or concentration correction information after update. In the case of deciding to generate print image data using the concentration correction information after update, the decision portion 108a sets the concentration correction information flag to turning on, and in the case of deciding to generate print image data using the concentration correction information before update, the concentration correction information flag is set to turning off. The concentration correction information flag is stored in the storage portion 106 correspondingly to print image data to be next generated.

Next, the control portion 108 determines whether or not the calibration execution portion 105 executes calibration and concentration correction information after update is newly stored in the storage portion 106, that is, the concentration correction information is updated (step S64). Also here, the calibration execution portion 105 does not execute calibration, and the concentration correction information is thus not updated (NO at step S64), and the process goes to step S65.

At step S65, the print image data generation portion 103 generates print image data using the concentration correction information before update. At the time, the print image data generation portion 103 stores the generated print image data in the storage portion 106 with a concentration correction information flag.

Next, the control portion 108 determines whether printing processing to be executed is N-up printing or saddle stitch printing (step S66 of FIG. 13A).

When printing processing is N-up printing or saddle stitch printing (YES at step S66), the control portion 108 determines whether print image data for N-up printing or saddle stitch printing is able to be generated (step S67). Here, in a case where print image data of 4 pages is stored in the storage portion 106 since the printing processing is 4-up printing, image data for 4-up printing is able to be generated, however, when the print image data of 4 pages is not stored in the storage portion 106, the print image data for 4-up printing is not able to be generated.

Currently, it is assumed that generation of print image data in the first page is finished, and the print image data is stored in the storage portion 106. In this case, since the print image data for 4-up printing is not able to be generated (NO at step S67), the process returns to step 62 for generating print image data in the second page, and processing at steps S63 to S67 is executed. As a result, the print image data in the second page is generated to be stored in the storage portion 106. Hereinafter, generation processing of print image data in the third page and the fourth page is executed, however, such processing is the same as generation processing of the print image data in the first page, which is thus omitted.

When generation processing of the print image data in the fourth page (step S65 of FIG. 13B) is finished, since print image data of 4 pages is stored in the storage portion 106, and print image data for N-up printing is able to be generated (YES at step S67 of FIG. 13A), the control portion 108 determines whether the printing portion 104 is able to execute printing processing (step S68). Specifically, the control portion 108 detects an operation state of the printing portion 104 and determines that, when the printing portion 104 does not execute printing processing of print image data, the printing portion 104 is able to execute printing processing (YES at step S68). Additionally, when the printing portion 104 is executing printing processing of print image data, the control portion 108 determines that the printing portion 104 is not able to execute printing processing (NO at step S68).

As explained at introduction of Example 2, there is a case where a generation processing speed of print image data is faster than a printing processing speed so that printing of print image data is not kept up therewith, and determining processing at step S68 is thus executed.

Here, it is assumed that the printing portion 104 is able to execute printing processing (YES at step S68). In this case, the print image data generation portion 103 generates print image data for N-up printing in which print image data of 4 pages is aggregated (step S69), and the printing portion 104 prints the print image data for N-up printing (step S70).

When printing processing of 1 page is executed, the control portion 108 determines whether or not the printed page is a last page (step S71), however, this is not the last page (NO at step S71), and the process thus returns to step S62.

Next, the process returns to step S62, and generation processing of print image data in the fifth page is started.

At the time, the concentration correction information flag is set to turning on at next step S63 (FIG. 13B) from step S62 (NO). The concentration correction information flag is stored in the storage portion 106 with print image data in the fifth page. Hereinafter, processing at steps S62 to 67 is executed until print image data in the eighth page is generated. Note that, print image data in the sixth to eighth pages is stored in the storage portion 106 with the concentration correction information flag to which turning off is set, respectively.

When print image data in the fifth to eighth pages is stored in the storage portion 106, print image data of 4 pages is stored in the storage portion 106, and print image data for N-up printing is able to be generated (YES at step S67 of FIG. 13A). Here, it is assumed that the printing portion 104 is not able to execute printing processing (NO at step S68). In this case, the process returns to step S62, and generation processing of print image data after the ninth page is started. It is assumed that the printing portion 104 is not able to execute printing processing even when generation processing of print image data in the ninth and tenth pages is finished (NO at step S68). Note that, the print image data in the ninth and tenth pages is stored in the storage portion 106 with the concentration correction information flag to which turning off is set, respectively.

Next, the process returns to step S62 to start generation processing of print image data in the eleventh page, and the processing at steps S63 and S64 of FIG. 13B is executed. Here, as explained in FIG. 12A to FIG. 12C, it is assumed that the calibration execution portion 105 executes calibration when print image data in the tenth page is generated (step S2 of FIG. 3A).

At the time, the concentration correction information is updated (YES at step S64), and the process thus goes to step S72.

At step S72, the control portion 108 determines whether unprinted print image data is stored in the storage portion 106. Here, since print image data from the fifth to tenth pages as unprinted print image data is stored in the storage portion 106 (YES at step S72), the control portion 108 next discriminates a state of the concentration correction information that is stored with this print image data, and determines whether there is the concentration correction information flag which is turned on, that is, whether or not print image data for which re-RIP is able to be executed with use of the concentration correction information after update is stored in the storage portion 106 (step S73).

Here, since print image data in the fifth and ninth pages is stored in the storage portion 106 as print image data whose concentration correction information flag is turned on (YES at step S73), the decision portion 108a of the control portion 108 decides whether re-RIP is executed for print image data in the fifth to tenth pages, or re-RIP is executed for print image data in the ninth and tenth pages, that is, priority is given to printing image quality, or priority is given to an image processing speed (step S74).

When a user turns on a radio button of "Detailed setting, priority to image quality" on the setting screen shown in FIG. 11, the decision portion 108a decides to give priority to printing image quality, and when turning on a radio button of "Detailed setting, priority to speed", the decision portion 108a decides to give priority to the image processing speed.

When the decision portion 108a decides to give priority to printing image quality (giving priority to image quality at step S74), the control portion 108 selects first print image data from among print image data for which re-RIP is able to be executed (print image data whose flag is turned on) using the concentration correction information after update, and further selects print image data that is stored in the storage portion 106 after this print image data (step S75). Here, print image data in the fifth to tenth pages is selected.

When the decision portion 108a decides to give priority to the image processing speed (giving priority to speed at step S74), the control portion 108 selects last print image data from among print image data for which re-RIP is able to be executed using the concentration correction information after update, and further selects print image data that is stored in the storage portion 106 after this print image data (step S76). Here, print image data in the ninth and tenth pages is selected.

Namely, at steps S75 and S76, the decision portion 108a selects print image data for which re-RIP is performed using the concentration correction information after update from among print image data that is stored in the storage portion 106 based on a content instructed by the operation portion 107 and print setting information of print data.

The print image data generation portion 103 executes re-RIP by applying the concentration correction information after update to print image data that is selected by the control portion 108 (step S77). Namely, the print image data generation portion 103 generates print image data such as N-up printing using the concentration correction information after update based on a selection result of the control portion 108.

Subsequently, the process goes to processing at step S66 of FIG. 13A.

Hereinafter, generation processing of print image data in an eleventh page and a twelfth page is executed, however, as described above, generation processing of print image data using the concentration correction information after update has already been executed (re-RIP) (YES at step S62), the concentration correction information after update is thus used to execute generation processing of print image data in the twelfth page (step S78).

Subsequently, as described above, printing processing of the generated print image data is executed, and printing of a last page is finished (YES at step S71), thereafter the processing is finished.

Note that, when unprinted print image data is not stored in the storage portion 106 (NO at step S72 of FIG. 13B), at the time of generation of print image data, the control portion 108 determines whether the concentration correction information before update is used, or the concentration correction information after update is used (step S79). When the concentration correction information after update is used (YES at step S79), processing at step S78 of FIG. 13A is executed, and when the concentration correction information before update is used (NO at step S79), processing at step S65 of FIG. 13B is executed.

This allows color tones of a printed material in the same page not to be stood out and differentiated even when calibration execution conditions are satisfied and the concentration correction information is updated while executing printing processing in sequential printing. Further, a user is able to designate printing processing by giving priority to image quality, or printing processing by giving priority to speed, and convenience for users is thus improved. Note that, in explanation of flowcharts of FIG. 13a and FIG. 13B, description has been made by illustrating a case where print setting information is N-up printing, however, it is of course possible to execute such sequential printing also in poster printing and the like.

As described above, according to the present invention, even when calibration execution conditions are satisfied and the concentration correction information is updated while executing printing processing, color tones of a printed material in the same page are not stood out and differentiated.

The invention claimed is:

1. A printing apparatus comprising:
 a calibration execution portion to update concentration correction information for correcting an image concentration;
 a concentration correction information storage portion to store concentration correction information after update that is updated by execution of calibration and concentration correction information before update;

a print image data generation portion to generate print image data using the concentration correction information, an analyzing portion to analyze print setting information according to print data; and a control portion to decide, when the calibration execution portion executes calibration while executing print image data generation processing based on the print setting information, whether the concentration correction information before update or the concentration correction information after update is used to generate print image data based on an analysis result of the analyzing portion; wherein the print image data generation portion generates print image data based on a decision result of the control portion, an operation portion to receive an instruction operation on whether printing is performed by giving priority to an image quality or printing is performed by giving priority to a speed, before execution of printing processing, and a print image data storage portion to store print image data for each page which is generated by the print image data generation portion in the order of generation are included, and the control portion selects, when the calibration execution portion executes calibration while executing print image data generation processing based on the print setting information, print image data to be newly generated using the concentration correction information after update from among print image data stored in the print image data storage portion based on an instruction content from the operation portion and an analysis result of print data analyzed by the analyzing portion, and the print image data generation portion generates print image data using the concentration correction information after update based on the selection.

2. The printing apparatus as defined in claim 1, wherein the control portion includes a counter function to count the number of pages of print image data to be generated, and when the print setting information of the print data is saddle stitch printing or double-sided printing, the control portion decides, in a case where the number of pages of the print image data to be generated after executing calibration is an even number, to generate print image data for the saddle stitch printing, or print image data for the double-sided printing using concentration correction information after update.

3. The printing apparatus as defined in claim 1, wherein when the print setting information of the print data is normal single-sided printing, the control portion decides, from print image data to be generated after executing calibration, to generate print image data for the single-sided printing using the concentration correction information after update.

4. The printing apparatus as defined in claim 1, wherein the control portion includes a counter function to count the number of pages of print image data to be generated, and when the print setting information of the print data is N-up printing, the control portion decides, in a case where the number of pages of print image data to be generated after executing calibration is 1+multiples of N, to generate print image data for N-up printing using the concentration correction information after update.

5. The printing apparatus as defined in claim 1, wherein the control portion includes a counter function to count the number of pages of print image data to be generated, and when the print setting information of the print data is multiple copy printing in which multiple copy printing is performed for a document of N pages in copy unit, the control portion decides to generate print image data for the multiple copy printing using the concentration correction information after update from a top page of a next copy.

6. The printing apparatus as defined in claim 1, wherein the control portion includes a counter function to count the number of pages of print image data to be generated, and when the print setting information of the print data is poster printing in which print image data corresponding to a document of 1 page is enlarged and divided into M×N and printed or poster printing in which print image data corresponding to a document of 1 page is divided into M×N and enlarged printing is performed for the print image data that is divided into M×N, the control portion decides, in a case where the number of pages of print image data to be generated after executing calibration is 1+multiples of (M×N), to generate print image data for the poster printing using the concentration correction information after update.

7. The printing apparatus as defined in claim 1, wherein the control portion includes a color mode detection function to detect a color mode of print image data to be generated, and when the print setting information of the print data is color/monochrome mixed printing, the control portion decides, in a case where a color mode of print image data to be generated after executing calibration is different from a color mode of print image data generated on a previous page, to generate print image data for the color/monochrome mixed printing using the concentration correction information after update.

8. A printing apparatus comprising:

a calibration execution portion to update concentration correction information for correcting an image concentration;

a concentration correction information storage portion to store concentration correction information after update that is updated by execution of calibration and concentration correction information before update;

a print image data generation portion to generate print image data using the concentration correction information, an analyzing portion to analyze print setting information according to print data; and a control portion to decide, when the calibration execution portion executes calibration while executing print image data generation processing based on the print setting information, whether the concentration correction information before update or the concentration correction information after update is used to generate print image data based on an analysis result of the analyzing portion; wherein the print image data generation portion generates print image data based on a decision result of the control portion, and the control portion includes a counter function to count the number of pages of print image data to be generated, when the print setting information of the print data is N-up printing, the control portion decides, in a case where the number of pages of print image data to be generated after executing calibration is 1+multiples of N, to generate print image data for N-up printing using the concentration correction information after update.

9. The printing apparatus as defined in claim 8, wherein an operation portion to receive an operation to input print setting information is included, and
the control portion executes the decision only when the print setting information received by the operation portion is the same as the print setting information of the print data analyzed by the analyzing portion.

10. A printing apparatus comprising:
a calibration execution portion to update concentration correction information for correcting an image concentration;
a concentration correction information storage portion to store concentration correction information after update that is updated by execution of calibration and concentration correction information before update;
a print image data generation portion to generate print image data using the concentration correction information,
an analyzing portion to analyze print setting information according to print data; and
a control portion to decide, when the calibration execution portion executes calibration while executing print image data generation processing based on the print setting information, whether the concentration correction information before update or the concentration correction information after update is used to generate print image data based on an analysis result of the analyzing portion; wherein
the print image data generation portion generates print image data based on a decision result of the control portion,
the control portion includes a counter function to count the number of pages of print image data to be generated, and
when the print setting information of the print data is poster printing in which print image data corresponding to a document of 1 page is enlarged and divided into M×N and printed or poster printing in which print image data corresponding to a document of 1 page is divided into M×N and enlarged printing is performed for the print image data that is divided into M×N,
the control portion decides, in a case where the number of pages of print image data to be generated after executing calibration is 1+multiples of (M×N), to generate print image data for the poster printing using the concentration correction information after update.

11. The printing apparatus as defined in claim 10, wherein an operation portion to receive an operation to input print setting information is included, and
the control portion executes the decision only when the print setting information received by the operation portion is the same as the print setting information of the print data analyzed by the analyzing portion.

12. A printing apparatus comprising:
a calibration execution portion to update concentration correction information for correcting an image concentration;
a concentration correction information storage portion to store concentration correction information after update that is updated by execution of calibration and concentration correction information before update;
a print image data generation portion to generate print image data using the concentration correction information,
an analyzing portion to analyze print setting information according to print data; and
a control portion to decide, when the calibration execution portion executes calibration while executing print image data generation processing based on the print setting information, whether the concentration correction information before update or the concentration correction information after update is used to generate print image data based on an analysis result of the analyzing portion; wherein
the print image data generation portion generates print image data based on a decision result of the control portion,
the control portion includes a color mode detection function to detect a color mode of print image data to be generated, and
when the print setting information of the print data is color/monochrome mixed printing,
the control portion decides, in a case where a color mode of print image data to be generated after executing calibration is different from a color mode of print image data generated on a previous page, to generate print image data for the color/monochrome mixed printing using the concentration correction information after update.

13. The printing apparatus as defined in claim 12, wherein an operation portion to receive an operation to input print setting information is included, and
the control portion executes the decision only when the print setting information received by the operation portion is the same as the print setting information of the print data analyzed by the analyzing portion.

14. A printing apparatus comprising:
a calibration execution portion to update concentration correction information for correcting an image concentration;
a concentration correction information storage portion to store concentration correction information after update that is updated by execution of calibration and concentration correction information before update;
a print image data generation portion to generate print image data using the concentration correction information,
an analyzing portion to analyze print setting information according to print data; and
a control portion to decide, when the calibration execution portion executes calibration while executing print image data generation processing based on the print setting information, whether the concentration correction information before update or the concentration correction information after update is used to generate print image data based on an analysis result of the analyzing portion; wherein
the print image data generation portion generates print image data based on a decision result of the control portion,
the control portion includes a counter function to count the number of pages of print image data to be generated, and
when the print setting information of the print data is multiple copy printing in which multiple copy printing is performed for a document of N pages in copy unit,
the control portion decides to generate print image data for the multiple copy printing using the concentration correction information after update from a top page of a next copy.

15. The printing apparatus as defined in claim 14, wherein an operation portion to receive an operation to input print setting information is included, and
the control portion executes the decision only when the print setting information received by the operation portion is the same as the print setting information of the print data analyzed by the analyzing portion.

16. A printing apparatus comprising:
a calibration execution portion to update concentration correction information for correcting an image concentration;
a concentration correction information storage portion to store concentration correction information after update that is updated by execution of calibration and concentration correction information before update;
a print image data generation portion to generate print image data using the concentration correction information,
an analyzing portion to analyze print setting information according to print data; and
a control portion to decide, when the calibration execution portion executes calibration while executing print image data generation processing based on the print setting information, whether the concentration correction information before update or the concentration correction information after update is used to generate print image data based on an analysis result of the analyzing portion; wherein
the print image data generation portion generates print image data based on a decision result of the control portion, and
when the print setting information of the print data is normal single-sided printing,
the control portion decides, from print image data to be generated after executing calibration, to generate print image data for the single-sided printing using the concentration correction information after update.

17. The printing apparatus as defined in claim 16, wherein an operation portion to receive an operation to input print setting information is included, and
the control portion executes the decision only when the print setting information received by the operation portion is the same as the print setting information of the print data analyzed by the analyzing portion.

18. A printing apparatus comprising:
a calibration execution portion to update concentration correction information for correcting an image concentration;
a concentration correction information storage portion to store concentration correction information after update that is updated by execution of calibration and concentration correction information before update;
a print image data generation portion to generate print image data using the concentration correction information,
an analyzing portion to analyze print setting information according to print data; and
a control portion to decide, when the calibration execution portion executes calibration while executing print image data generation processing based on the print setting information, whether the concentration correction information before update or the concentration correction information after update is used to generate print image data based on an analysis result of the analyzing portion; wherein
the print image data generation portion generates print image data based on a decision result of the control portion,
the control portion includes a counter function to count the number of pages of print image data to be generated, and
when the print setting information of the print data is saddle stitch printing or double-sided printing,
the control portion decides, in a case where the number of pages of the print image data to be generated after executing calibration is an even number, to generate print image data for the saddle stitch printing, or print image data for the double-sided printing using concentration correction information after update.

19. The printing apparatus as defined in claim 18, wherein an operation portion to receive an operation to input print setting information is included, and
the control portion executes the decision only when the print setting information received by the operation portion is the same as the print setting information of the print data analyzed by the analyzing portion.

* * * * *